(12) United States Patent
Kusunoki et al.

(10) Patent No.: US 6,617,774 B1
(45) Date of Patent: Sep. 9, 2003

(54) THIN-FILM ELECTRON EMITTER DEVICE HAVING MULTI-LAYERED ELECTRON EMISSION AREAS

(75) Inventors: Toshiaki Kusunoki, Tokorozawa (JP); Mutsumi Suzuki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/546,690

(22) Filed: Apr. 10, 2000

(51) Int. Cl.[7] .............. H01J 1/30; H01J 9/02; H01L 29/06
(52) U.S. Cl. ............ 313/311; 313/496; 313/306; 313/326; 257/10
(58) Field of Search ................ 313/306, 310, 313/311, 309, 495, 326, 444, 496; 257/10

(56) References Cited

U.S. PATENT DOCUMENTS 5,936,257 A * 8/1999 Kusunoki et al. .......... 257/10
5,962,959 A * 10/1999 Iwasaki et al. ............ 313/310
5,990,605 A * 11/1999 Yoshikawa et al. ........ 313/309
6,316,873 B1 * 11/2001 Ito et al. .................... 313/309

FOREIGN PATENT DOCUMENTS

| JP | 4-289644 | 10/1992 |
| JP | 7-65710 | 3/1995 |
| JP | 10-92299 | 4/1998 |

* cited by examiner

Primary Examiner—Nimeshkumar D. Patel
Assistant Examiner—Sikha Roy
(74) Attorney, Agent, or Firm—Mattingly, Stanger & Malur, P.C.

(57) ABSTRACT

In order to provide a thin-film electron emitter device of a structure wherein electric connection between a top electrode and top electrode busline can be secured and also to provide a display apparatus using the thin-film electron emitter device, the top electrode busline thin on its connection side with the top electrode is formed on a field insulator which is thicker than an insulator forming electron emission areas and which is formed around the insulator, and the top electrode covers the top electrode busline to be connected with said thin part of said top electrode busline.

16 Claims, 24 Drawing Sheets

FIG. 2a
FIG. 2b
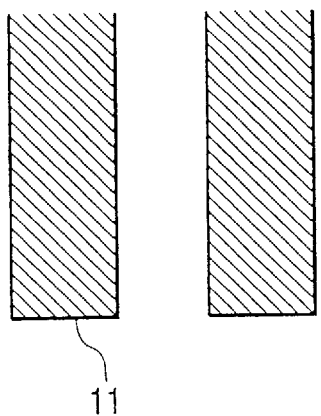
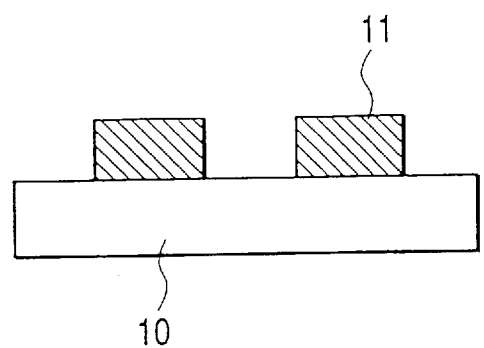
FIG. 3a
FIG. 3b
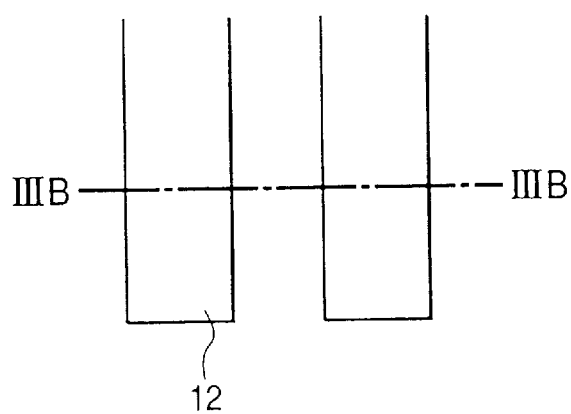
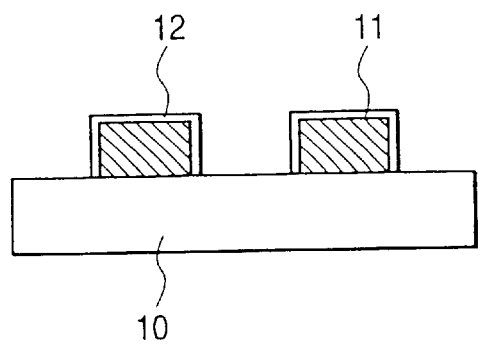

FIG. 21a
FIG. 21b
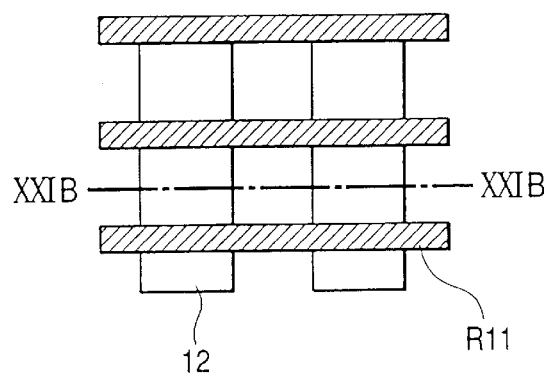
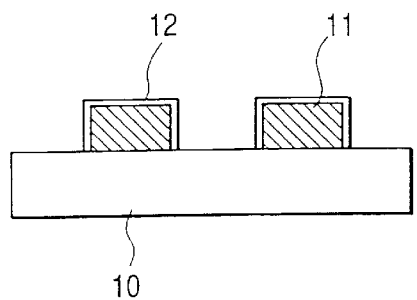
FIG. 22a
FIG. 22b
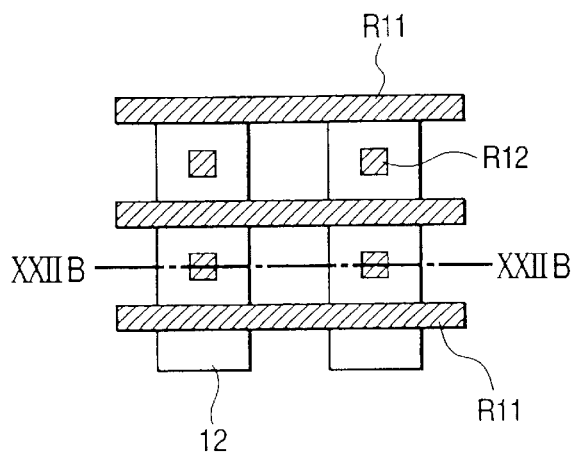
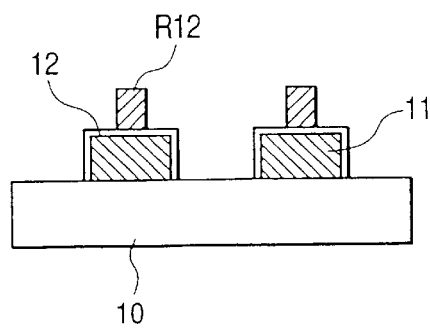

THIN-FILM ELECTRON EMITTER DEVICE HAVING MULTI-LAYERED ELECTRON EMISSION AREAS

BACKGROUND OF THE INVENTION

The present invention relates to a thin-film electron emitter device which has an electron emission area of three layer structure of a base electrode, an insulator and a top electrode to emit electrons from the top electrode into a vacuum, and also to a display apparatus using the electron emitter device.

One of display apparatuses which use a cold cathode array having cold cathodes arranged at intersections of a group of electrodes perpendicular to each other, is such a field emission display (FED) as disclosed, e.g., in JP-A-4-289644 (laid open on Oct. 14, 1992) corresponding to U.S. Ser. No. 5,908,70 filed on Oct. 1, 1990 (assignee: Raytheon Company). The FED, which has a multiplicity of field emitters arranged at pixels, acts to accelerate field electrons emitted from the emitters in a vacuum and to direct them to phosphors for luminescence.

Meanwhile, a thin-film electron emitter device acts to emit hot electrons generated in an insulator from a surface of a top electrode into a vacuum by a voltage applied between a top electrode and base electrode of a three layer structure including the base electrode, insulator and top electrode. The thin-film electron emitter devices include an MIM (metal-insulator-metal) electron emitter device in which top and base electrodes are made of metals and an MIS (metal-insulator-semiconductor) electron emitter device in which at least one of the top and base electrodes is made of semiconductor. One of the MIM electron emitter devices is disclosed, e.g., in JP-A-7-65710 (laid open on Mar. 10, 1995). Included in other known types of electron emitter devices are a device wherein an insulating film, an insulator and a semiconductor film are laminated in this order, a device wherein the above lamination order is made reversed, a device wherein the semiconductor film is made of porous semiconductor, and a device wherein an upper surface of the porous semiconductor is oxidized. In the thin-film electron emitter devices of various types of insulator structures, the insulator acts as an electron accelerating layer.

SUMMARY OF THE INVENTION

When compared to the field emitter used in the FED, the thin-film electron emitter device has characteristics preferable in a display apparatus such as a high surface contamination resistance and a low driving voltage. However, the prior art thin-film electron emitter device has had problems that it is short in life because concentration of a field in the insulator at the edge of the device causes its breakdown and that formation of such a thin-film electron emitter device into a matrix causes uneven distribution of the amount of emitted electrons on a plane. In order to solve these problems, we proposed a structure of a thin-film electron emitter device in which a thick field insulator for preventing field concentration of the insulator at its ends and a top electrode busline for reducing a wiring resistance of a top electrode are provided to provide a long operating life and a uniform in-plane electron emission distribution, and also proposed a method for manufacturing the emitter device, in Japanese Patent Application No. 8-250279 (JP-A-10-92299 laid open on Apr. 10, 1998) filed on Sep. 20, 1996.

This structure is featured in that the top electrode is deposited so as to cover the top electrode busline layer to form a laminated top electrode busline. When such a structure that the top electrode is finally formed, is employed, process damage of the insulator can be prevented or recovered, thus enabling fabrication of a thin-film electron emitter device having a high reliability. Further it is possible to form the top electrode busline on the field insulator and to form the top electrode on the insulator in a self-alignment relation.

When it is desired to manufacture a large-size display apparatus, this involves a problem of increased wiring resistance. For this reason, the top electrode busline is made as thick as possible. However, when the top electrode busline is made too thick, this causes a step at ends of the top electrode busline to become sharp, whereby the top electrode to be formed on the top electrode busline tends to be easily broken and disconnected at the step parts and to generate a failure.

It is therefore an object of the present invention to provide a thin-film electron emitter device of a structure wherein reliable electric connection between a top electrode and a top electrode busline can be established, and also to provide a display apparatus using such a device.

In accordance with an aspect of the present invention, a top electrode busline made thin on its connection side with a top electrode is formed on a field insulator thicker than an insulator and formed around the insulator forming electron emission areas, and the top electrode covers the top electrode busline to be connected with thin areas thereof.

BRIEF DESCRIPTION OF THE DRAWINGS

FIGS. 2a and 2b are plan and cross-sectional views of the device at a stage of forming a base electrode in FIG. 1 respectively;

FIGS. 3a and 3b are plan and cross-sectional views of the device at a stage of forming an insulator in FIG. 1 respectively;

FIGS. 21a and 21b are plan and cross-sectional views of the device at a stage of forming a resist pattern R11 in FIG. 20 respectively;

FIGS. 22a and 22b are plan and cross-sectional views of the device at a stage of forming a resist pattern R12 in FIG. 20 respectively;

DETAILED DESCRIPTION OF THE EMBODIMENTS

Embodiment 1

Figure 1:
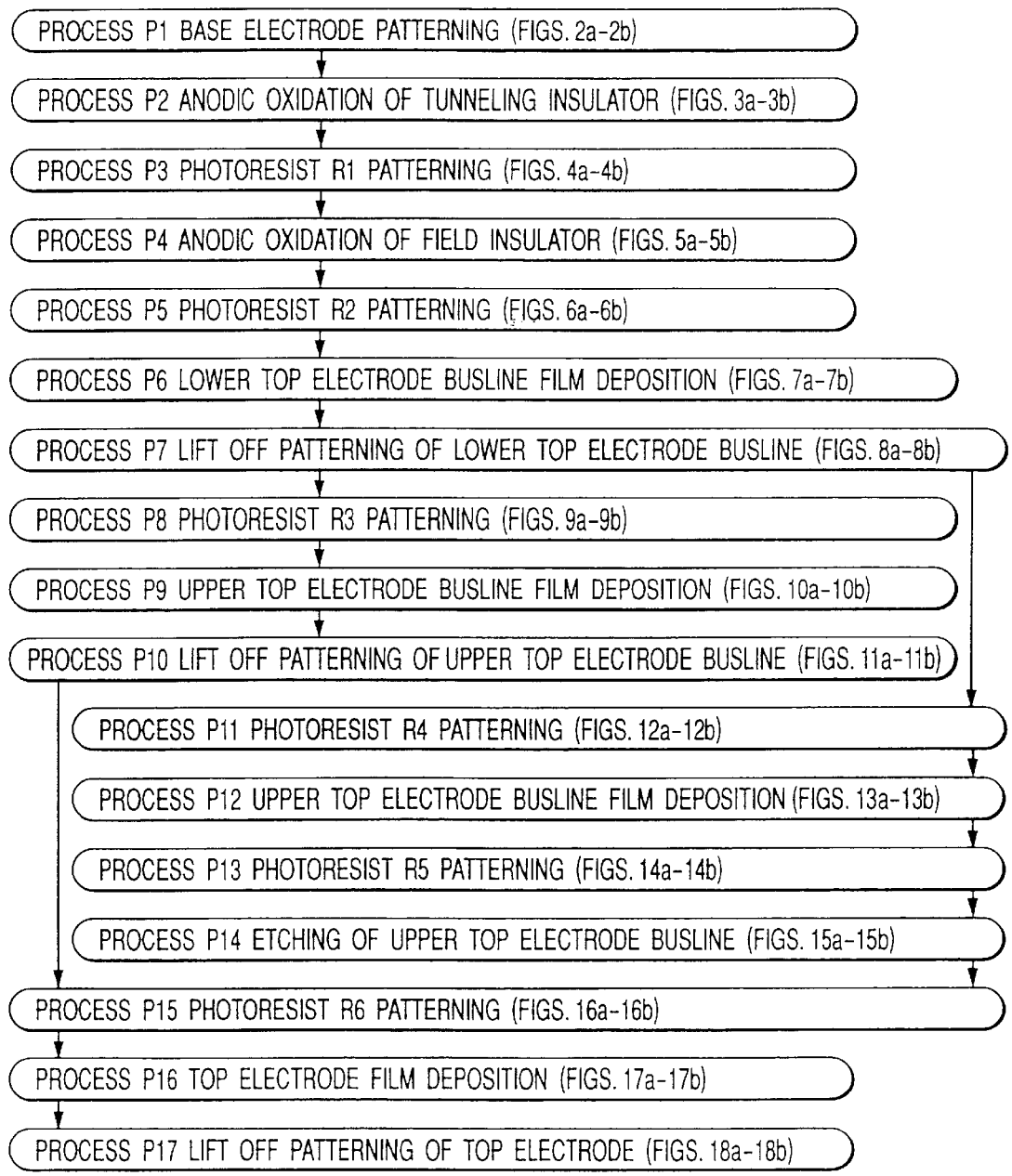
FIG. 1 is a process flowchart for explaining a method for manufacturing a thin-film electron emitter device in accordance with embodiment 1 of the present invention.
Figure 18A:
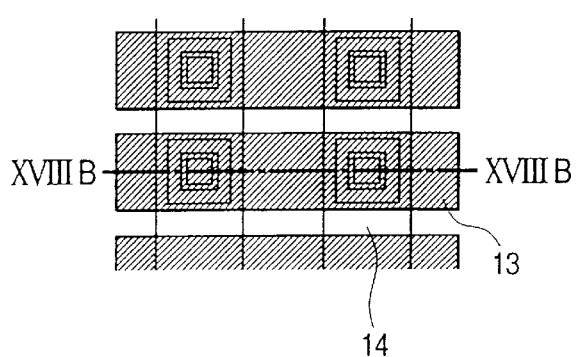
FIGS. 18a and 18b are plan and cross-sectional views of the device at a stage of forming a top electrode in FIG. 1 respectively.
Figure 18B:
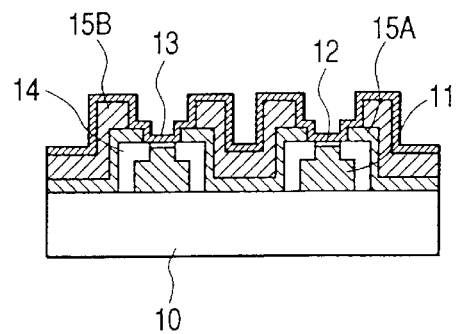
Figure 19:
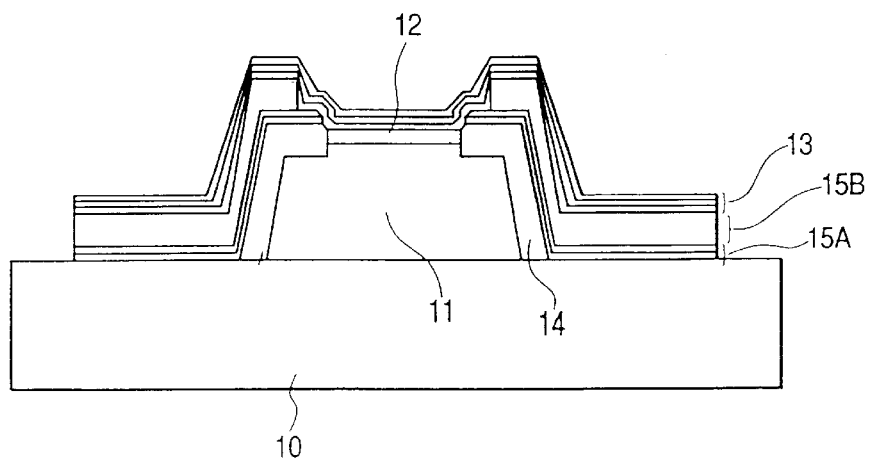
FIG. 19 is a cross-sectional view of the thin-film electron emitter device of embodiment 1 of the present invention corresponding to one electron emitter.

A thin-film electron emitter device in accordance with embodiment 1 will be explained with reference to FIG. 1, FIGS. 2a and 2b, 3a and 3b, 4a and 4b, 5a and 5b, 6a and 6b, 7a and 7b, 8a and 8b, 9a and 9b, 10a and 10b, 11a and 11b, 12a and 12b, 13a and 13b, 14a and 14b, 15a and 15b, 16a and 16b, 17a and 17b, 18a and 18b, and FIG. 19. FIG. 1 shows a flowchart for explaining a method for manufacturing a thin-film electron emitter device; FIGS. 2a and 2b, 3a and 3b, 4a and 4b, 5a and 5b, 6a and 6b, 7a and 7b, 8a and 8b, 9a and 9b, 10a and 10b, 11a and 11b, 12a and 12b, 13a and 13b, 14a and 14b, 15a and 15b, 16a and 16b, 17a and 17b, 18a and 18b, show plan and cross-sectional views of the device in manufacturing steps respectively; and FIG. 19 is a cross-sectional view of the thin-film electron emitter device corresponding to one electron emitter.

At a step P1, first of all, an Al film having a thickness of e.g., 300 nm is formed as a thin film for formation of a base electrode 11 on an insulating substrate 10 made of glass or the like. The formation of the Al film is carried out, for example, by sputtering, resistance heating evaporation or molecular beam epitaxy (MBE). Next, the Al film is subjected to a resist forming process based on photolithography and then to an etching process into such stripes 11 as shown in FIGS. 2a and 2b. The etching may be carried out by wet etching or dry etching.

Explanation will next be made as to a process of fabricating a featured part of the present invention including an insulator 12, a field insulator 14, a top electrode busline lower film 15A, a top electrode busline upper film 15B and a top electrode 13.

As shown in FIGS. 3a and 3b, first, an $Al_2O_3$ insulator 12 having a thickness of 5.5 nm is formed by a anodic oxidation method with use of an anodic oxidation voltage of 4V at a step P2.

Figure 4A:
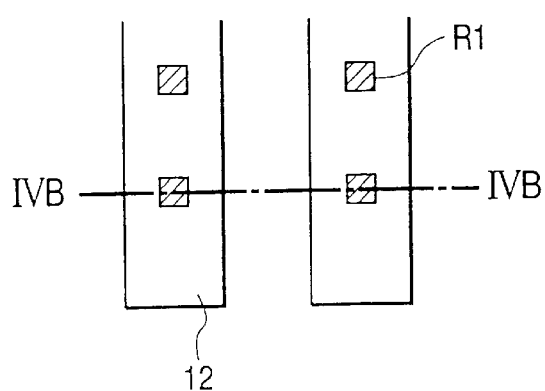
FIGS. 4a and 4b are plan and cross-sectional views of the device at a stage of forming a resist pattern R1 in FIG. 1 respectively.
Figure 4B:
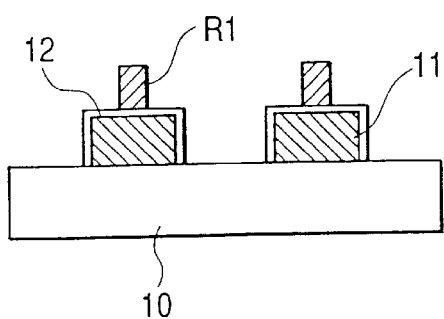

As shown in FIGS. 4a and 4b, next, a resist pattern R1 for covering areas to be formed therein as emission areas arranged in the form of a matrix is formed in the form of a matrix at a step P3.

Figure 5A:
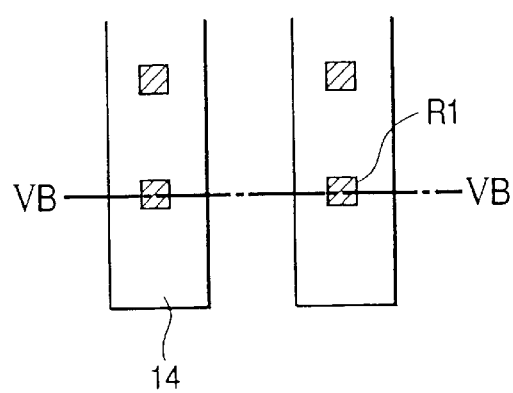
FIGS. 5a and 5b are plan and cross-sectional views of the device at a stage of forming a field insulator in FIG. 1 respectively.
Figure 5B:
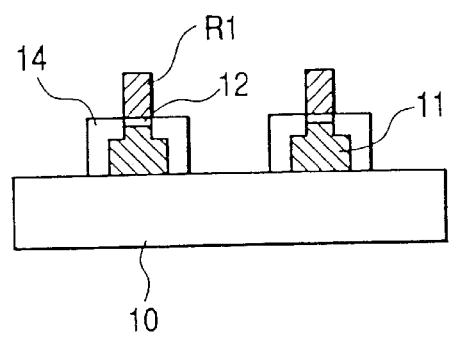

As shown in FIGS. 5a and 5b, the field insulator 14 is then formed by an anodic oxidation method at a step P4. Areas of the field insulators 14 covered with the resist pattern R1 are not oxidized and remain as a thin insulating layer for formation of electron emission areas. In areas of the field insulators not covered with the resist pattern R1, the insulator is previously formed at the step 12 as mentioned above. However, the oxidation of the areas of the field insulator not covered with the pattern can be further advanced when a high anodic oxidation voltage is applied thereto, thus forming a thick field insulator 14. In the present embodiment, the anodic oxidation voltage was set at 50V and a field insulator 14 having a thickness of 68 nm was formed. Since the anodic oxidation method is employed, even when a thick field insulator 14 is formed, a step at a boundary between the field insulator 14 and insulator 12 can be made small, which results in that a top electrode 13 to be formed later can be less broken and disconnected. After formation of the field insulator 14, the resist pattern R1 is previously peeled off.

Explanation will then be made as to how to fabricate a top electrode busline 15 made up of a lower film 15A and an upper film 15B.

Figure 6A:
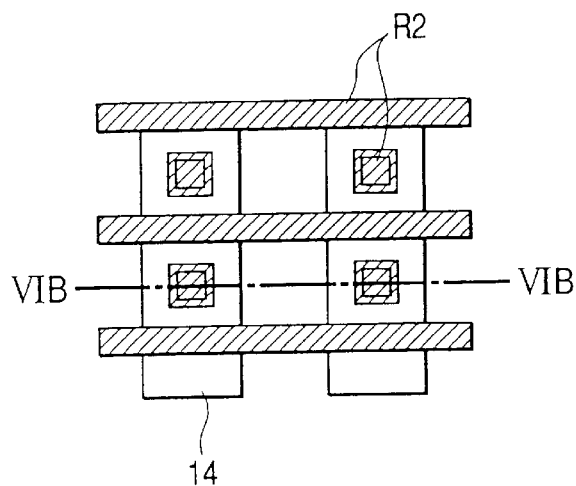
FIGS. 6a and 6b are plan and cross-sectional views of the device at a stage of forming a resist pattern R2 in FIG. 1 respectively.
Figure 6B:
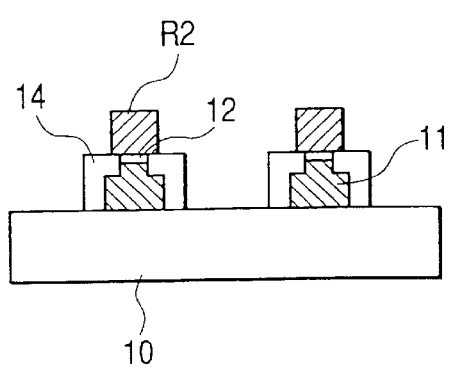

As shown in FIGS. 6a and 6b, first, a resist pattern R2 for covering zones of the resultant substrate surrounding the emission areas and areas thereof to be used as spaces between the top electrode buslines 15 is formed at a step P5.

Figure 7A:
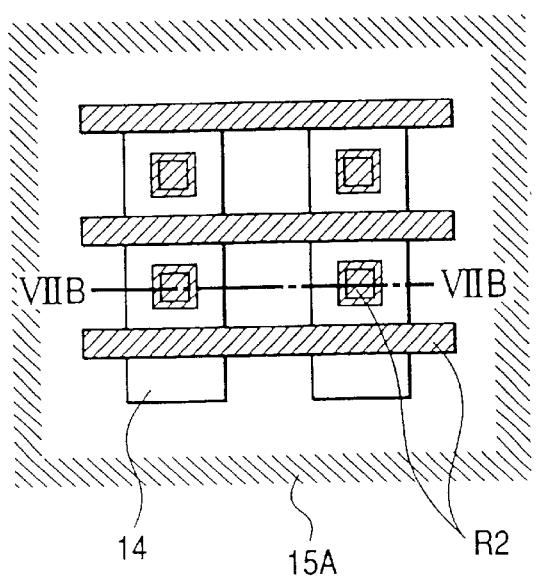
FIGS. 7a and 7b are plan and cross-sectional views of the device at a stage of depositing a metallic film as a top electrode busline lower film in FIG. 1 respectively.
Figure 7B:
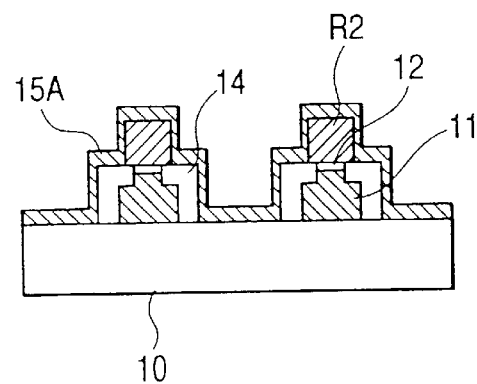
Figure 8A:
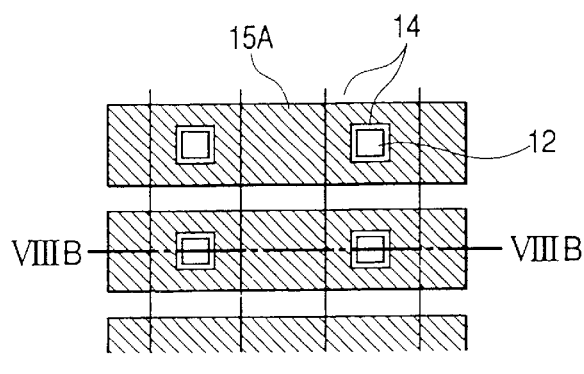
FIGS. 8a and 8b are plan and cross-sectional views of the device at a stage of forming the lower film of the top electrode busline in FIG. 1 respectively.
Figure 8B:
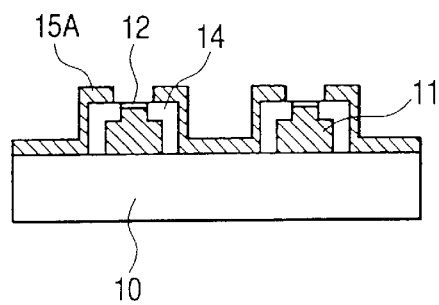

As shown in FIGS. 7a and 7b, thereafter, a metallic film as the top electrode busline lower film 15A is deposited at a step P6 on the entire surface of the resultant substrate. The metallic film as the top electrode busline lower film 15A is of a structure of two metallic layers, one of which is strong in its adhesive property to the substrate 10 and insulator 12 and the other of which has a less-oxidizing surface, the layers being laminated in this order. Use of the metallic layer having the less-oxidizing surface enables reliable electric contact of the metallic film with the top electrode busline upper film 15B and top electrode 13 to be formed later. The metallic layer having the excellent adhesive property may be omitted when satisfying the adhesive property requirement of the metallic layer having the less-oxidizing surface. In the present embodiment, the metallic layer strong in its adhesive property to the substrate 10 and insulator 12 was made of Mo, while the metallic layer having the less-oxidizing surface was made of Pt. The metallic layer strong in its adhesive property to the substrate 10 and insulator 12 may be made of Cr, Ta, W or Nb, whereas the metallic layer having the less-oxidizing surface may be made, in addition to Pt, of Au, Ir, Rh or Ru. It is desirable that the metallic film as the top electrode busline lower film 15A be made as thin as possible. In the present embodiment, the Mo metallic layer was set to have a thickness of 20 nm, and the Pt metallic layer was set to have a thickness of 10 nm. As a result, the step of the top electrode busline lower film 15A can be made small, and thus breakage and disconnection of the top electrode 13 to be formed later can be avoided. The metallic film as the top electrode busline lower film 15A is then, at a step P7, formed into a stripe-shaped top electrode busline lower film 15A having openings at its portions surrounding the emission areas, by subjecting the resist pattern R2 to a lift-off process, as shown in FIGS. 8a and 8b.

Figure 9A:
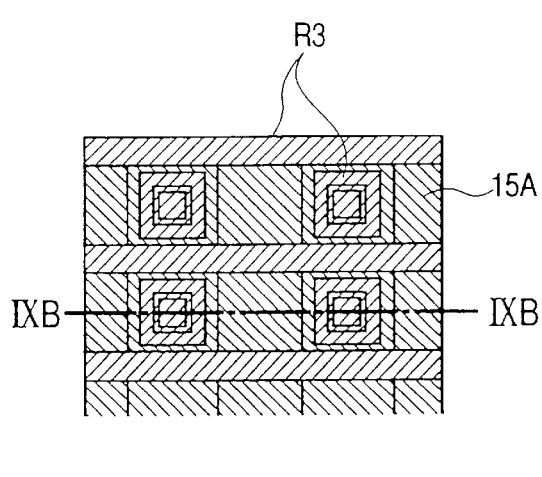
FIGS. 9a and 9b are plan and cross-sectional views of the device at a stage of forming a resist pattern R3 in FIG. 1 respectively.
Figure 9B:
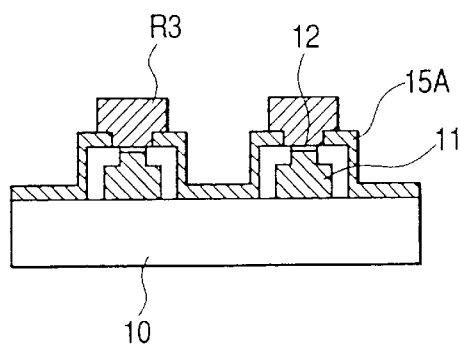

The top electrode busline upper film 15B is fabricated by a lift-off method or an etching method. When the lift-off method is employed, a resist pattern R3 for covering zones of the resultant substrate surrounding the emission areas and also surrounding the openings of the top electrode busline lower film 15A and for covering areas thereof corresponding to the spaces between the top electrode buslines 15 is formed at a step P8, as shown in FIGS. 9a and 9b.

Figure 10A:
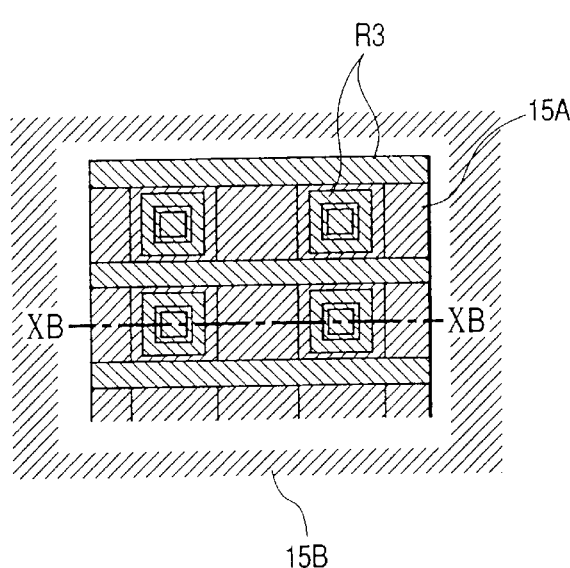
FIGS. 10a and 10b are plan and cross-sectional views of the device at a stage of depositing a metallic film as a top electrode busline upper film in FIG. 1 respectively.
Figure 10B:
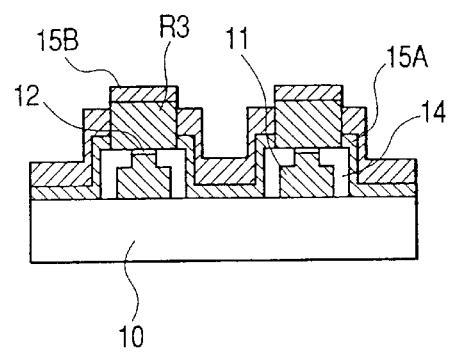
Figure 11A:
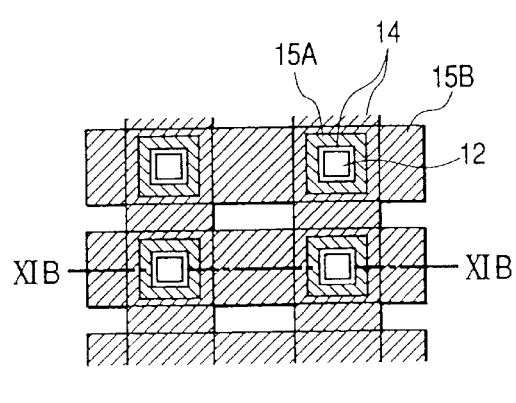
FIGS. 11a and 11b are plan and cross-sectional views of the device at a stage of forming the upper film of the top electrode busline in FIG. 1 respectively.
Figure 11B:
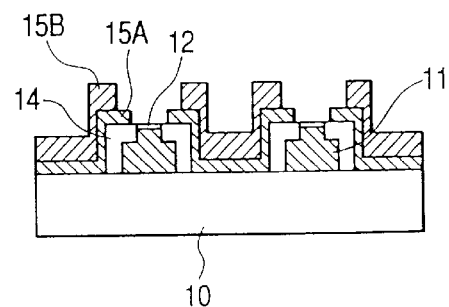

As shown in FIGS. 10a and 10b, a metallic film to be formed as the top electrode busline upper film 15B is formed at a step P9 on the entire surface of the resultant substrate. In the present embodiment, the metallic film is made of Al material having a low resistance and made to have a thickness of about 1 μm. In addition to Al, Au or the like having a low resistance may be used therefor. When the film formation is carried out by the lift-off method, it is implemented by such a method as a resistance heating evaporation method having a good particle straight-traveling property at the time of the film deformation. This facilitates less deposition of the metallic film onto side faces of the resist pattern R3 and also facilitates lift-off thereof even when the film is thick. When the top electrode busline upper film 15B is made thick, reduction in wiring resistance as an initial purpose of the top electrode busline 15 can be realized. After the film deposition or formation, the resist pattern R3 is subjected at a step P10 to a lift-off process to thereby form stripe-shaped top electrode busline upper films 15B having openings corresponding to ones surrounding the emission areas and also surrounding the openings of the top electrode busline lower film 15A, as shown in FIGS. 11a and 11b.

Figure 12A:
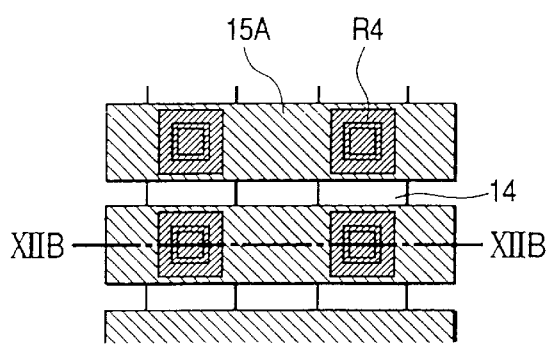
FIGS. 12a and 12b are plan and cross-sectional views of the device at a stage of forming a resist pattern R4 in FIG. 1 respectively.
Figure 12B:
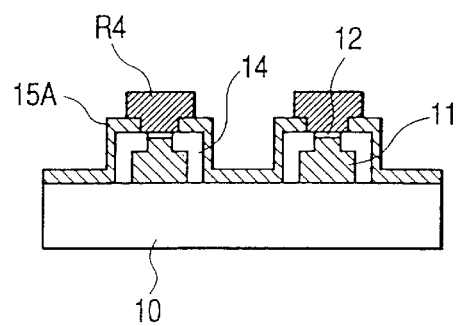
Figure 13A:
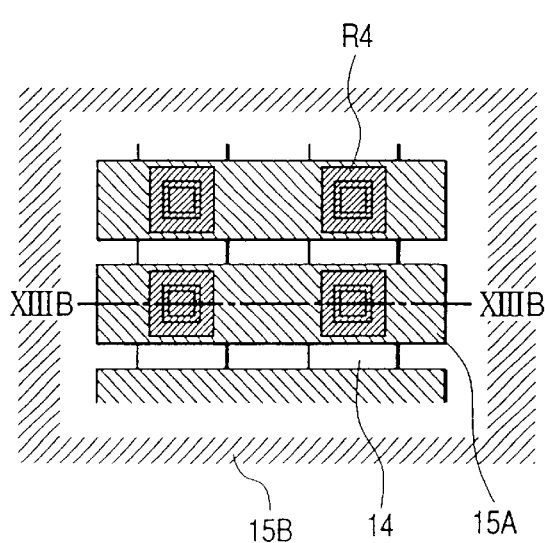
FIGS. 13a and 13b are plan and cross-sectional views of the device at a stage of depositing a metallic film as the upper film of the top electrode busline in FIG. 1 respectively.
Figure 13B:
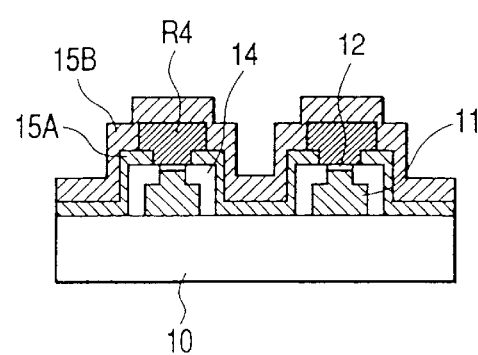
Figure 14A:
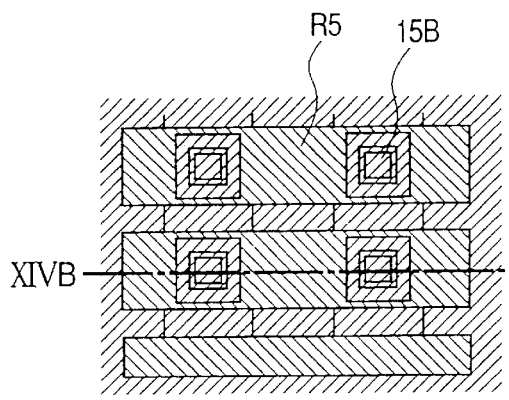
FIGS. 14a and 14b are plan and cross-sectional views of the device at a stage of forming a resist pattern R5 in FIG. 1 respectively.
Figure 14B:
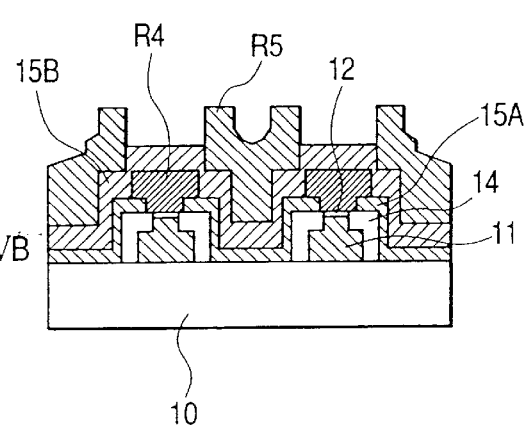
Figure 15A:
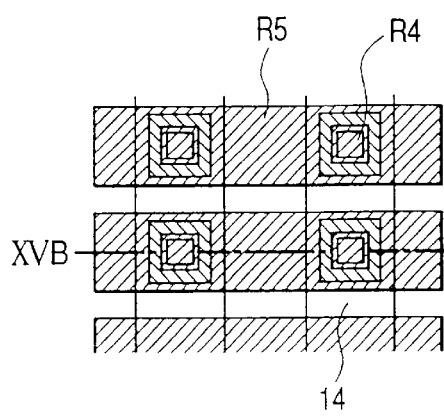
FIGS. 15a and 15b are plan and cross-sectional views of the device at a stage of forming the upper film of the top electrode busline in FIG. 1 respectively.
Figure 15B:
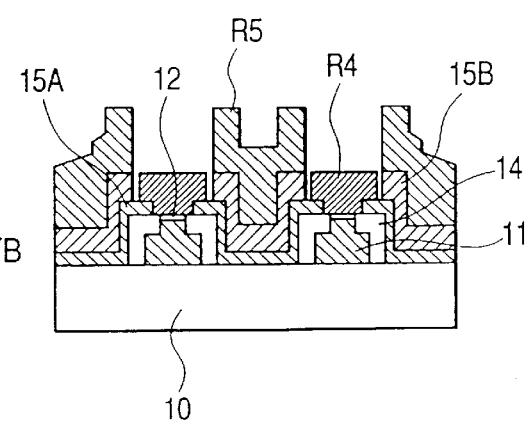

When this is carried out by the etching process, a resist pattern R4 is first formed at a step P11 to cover the zones surrounding the emission areas, as shown in FIGS. 12a and 12b. As shown by a step P12 in FIGS. 13a and 13b, next, a metallic film to be later formed as the top electrode busline upper film 15B is formed. In the present embodiment, the metallic film was made of Al and made to have a thickness of about 1 μm. When the etching process is employed, the film formation may be carried out by such a method as a sputtering process having a bad particle straight-traveling property at the time of the film deposition. As shown in FIGS. 14a and 14b, a resist pattern R5 having openings corresponding to its zones surrounding the resist pattern R4 and having areas covering the top electrode busline upper film 15B is then formed at a step P13. Subsequently the metallic film is etched at a step P14 to form a top electrode busline upper film 15B, as shown in FIGS. 15a and 15b. In this case, the resist pattern R5 covering the field insulator 14, top electrode busline lower film 15A and electron emitters acts an etching stopper. After the etching, the resist patterns R4 and R5 are previously peeled off.

Figure 16A:
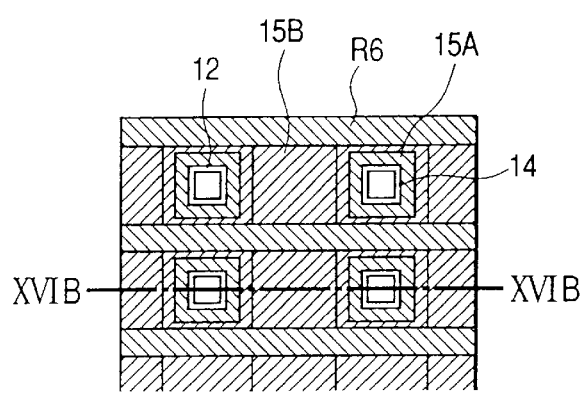
FIGS. 16a and 16b are plan and cross-sectional views of the device at a stage of forming a resist pattern R6 in FIG. 1 respectively.
Figure 16B:
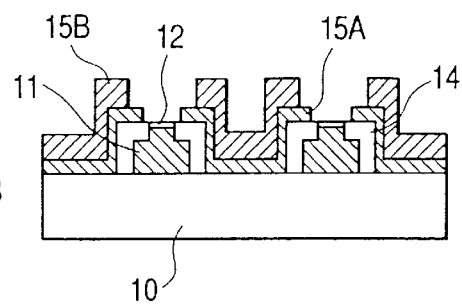

Finally explanation will be made as to a process of forming the top electrode 13. As shown in FIGS. 16a and 16b, a resist pattern R6 is first formed at a step P15 to cover areas corresponding to spaces between the top electrodes 13. In this case, the insulator 12, which tends to be easily damaged by a developing solution or the like at the time of developing a resist, is restored. To this end, the insulator 12 is again subjected to an anodic oxidation process with the resist pattern remaining thereon. In the present embodiment, the anodic oxidation voltage was set at 4V. This enables restoration of only damage without changing the thickness of the insulator 12.

Figure 17A:
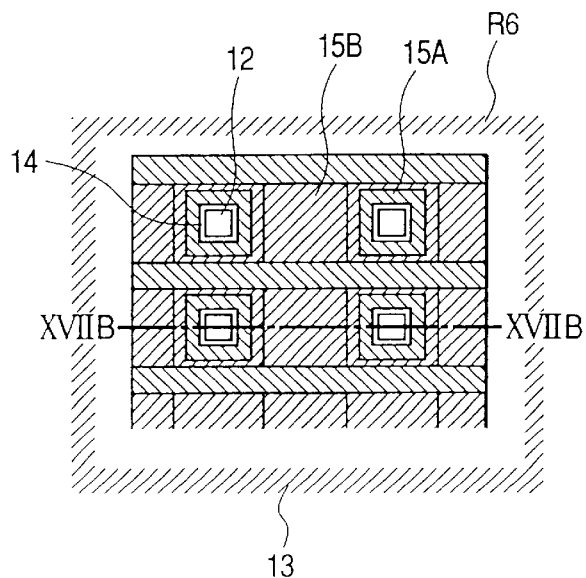
FIGS. 17a and 17b are plan and cross-sectional views of the device at a stage of forming a top electrode film in FIG. 1 respectively.
Figure 17B:
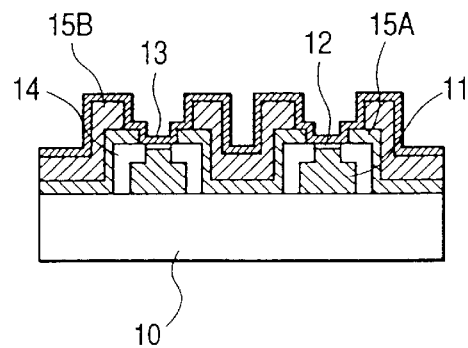

As shown in FIGS. 17a and 17b, next, a metallic film to be formed as the top electrode 13 is deposited at a step P16. The metallic film to be formed as the top electrode 13 is of a structure of three layers, i.e., lower one of which has a good heat resistance, intermediate one of which is made of Pt, and upper one of which is made of Au having a good electron emission efficiency. In the present embodiment, these layers were set to have thicknesses of 1 nm, 2 nm and 3 nm respectively and to have a total thickness of 6 nm. The metallic film to be formed as the top electrode 13 is subjected at a step P17 to a lift-off process to form a stripe-shaped top electrode 13, as shown in FIGS. 18a and 18b.

In this connection, although the top electrode has been formed so as to cover the field insulator 14, top electrode busline lower film 15A and top electrode busline upper film 15B, in addition to the electron emitters in the present embodiment; it is also possible for the top electrode to cover only the electron emission areas and top electrode busline lower film 15A. In short, it is only required to attain electric connection between the top electrode and top electrode busline lower film 15A.

FIG. 19 shows a cross-sectional view of a thin-film electron emitter device manufactured in such a manner mentioned above and corresponding to one electron emitter. The electron emitter has a featured structure that an opening of the thin top electrode busline lower film 15A is provided closer to an electron emission area than an opening of the top electrode busline upper film 15B, and a top electrode is formed on the top electrode busline upper film 15B, top electrode busline lower film 15A, field insulator 14, and insulator 12 of the emission area surrounded thereby. Since the top electrode busline lower film 15A is made thin, the top electrode 13 can be less broken or disconnected at its step, so that, even when the step of the top electrode busline upper film 15B is highly sharp, electric connection thereof with the top electrode busline 15 can be maintained. Accordingly the top electrode busline 15b can have any large thickness and the top electrode busline 15 having a low resistance can be realized.

Embodiment 2

Figure 20:
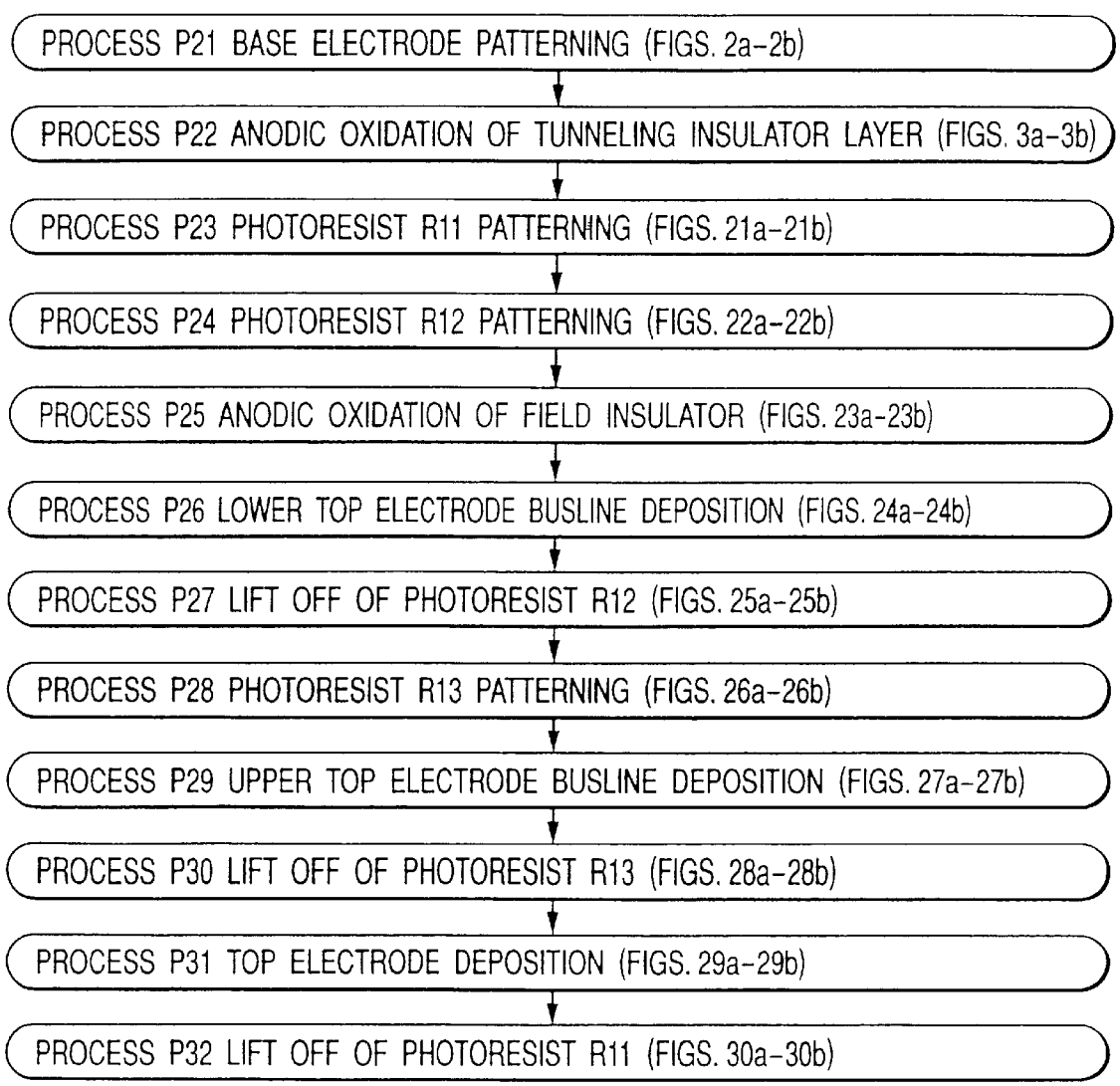
FIG. 20 is a process flowchart for explaining a method for manufacturing a thin-film electron emitter device in accordance with embodiment 2 of the present invention.

Explanation will next be made as to a thin-film electron emitter device in accordance with embodiment 2 by referring to FIGS. 2a and 2b, 3a and 3b, 20, 21a and 21b, 22a and 22b, 23a and 23b, 24a and 24b, 25a and 25b, 26a and 26b, 27a and 7b, 28a and 28b, 29a and 29b, 30a and 30b, and 31. FIG. 20 is a flowchart for explaining steps in a method for manufacturing a thin-film electron emitter device; FIGS. 2a and 2b, 3a and 3b, 20, 21a and 21b, 22a and 22b, 23a and 23b, 24a and 24b, 25a and 25b, 26a and 26b, 27a and 7b, 28a and 28b, 29a and 29b, and 30a and 30b are plan and cross-sectional views in the respective steps respectively; and FIG. 31 is a cross-sectional view of the thin-film electron emitter device corresponding to one electron emitter.

A base electrode 11 is first formed at a step P21 as shown in FIGS. 2a and 2b, and then subjected to an anodic oxidation process under an anodic oxidation voltage of 4V to form an $Al_2O_3$ insulator 12 having a thickness of 5.5 nm at a step P22, as shown in FIGS. 3a and 3b. At a next step P23, a resist whose solubility to a solvent varies with a post-bake temperature after development, for example, a quinone-diazide-based positive photoresist is used to first form a resist pattern R11 covering areas corresponding to spaces between top electrode buslines 15, and then the pattern is subjected to a post-bake process at a high temperature of 140–160° C., as shown in FIGS. 21a and 21b. In this case, because of its condensation, the resist becomes insoluble in acetone and alcohol, another solvent becomes necessary. Subsequently at a step P24, a resist pattern R12 for covering emission areas arranged in the form of a matrix is formed in the form of a matrix and then subjected to a post baking process at a low temperature of 70–130° C., as shown in FIGS. 22a and 22b. The resist pattern R12 is soluble in acetone and alcohol.

Figure 23A:
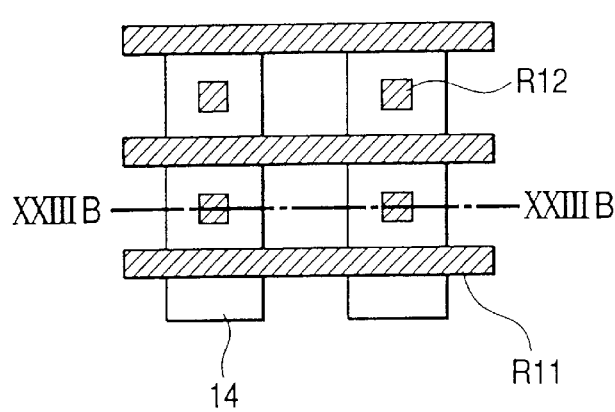
FIGS. 23a and 23b are plan and cross-sectional views of the device at a stage of forming a field insulator in FIG. 20 respectively.
Figure 23B:
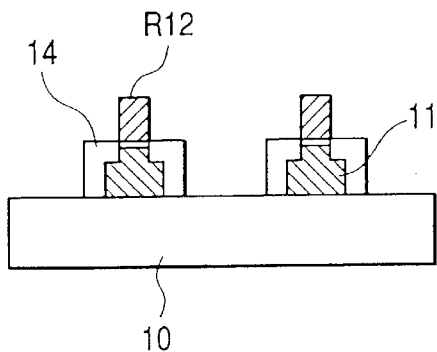

At a next step P25, as shown in FIGS. 23a and 23b, the resultant substrate other than the emission areas is subjected to an anodic oxidizing process with use of these resist patterns R11 and R12 as masks to form a field insulator 14. The thickness of the field insulator 14 can be controlled by a anodic oxidation voltage. In this case, the anodic oxidation voltage was set at 50V and the $Al_2O_3$ field insulator 14 was formed to have a thickness of 68 nm.

Figure 24A:
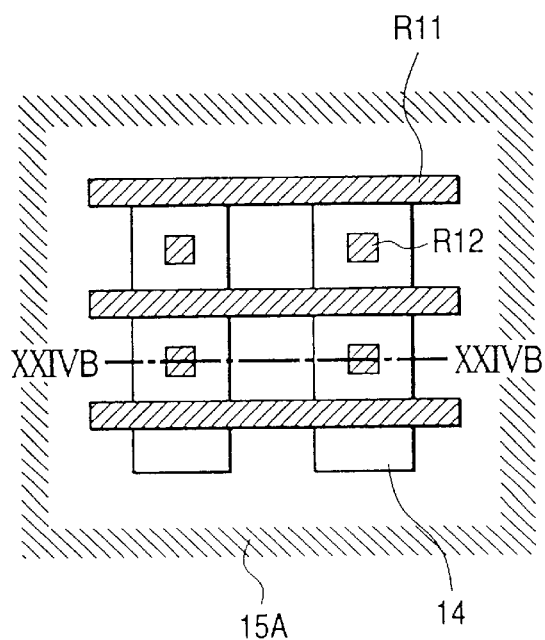
FIGS. 24a and 24b are plan and cross-sectional views of the device at a stage of depositing a metallic film as a top electrode busline lower film in FIG. 20 respectively.
Figure 24B:
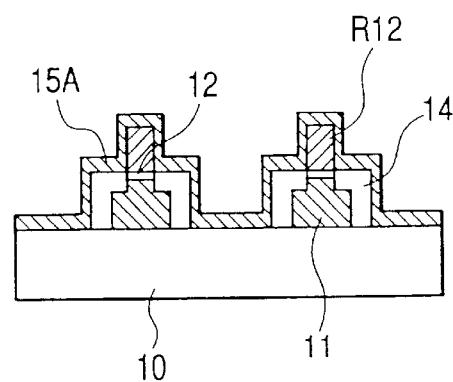
Figure 25A:
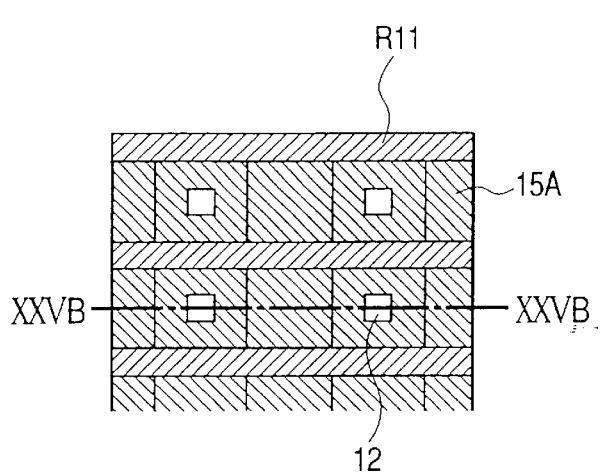
FIGS. 25a and 25b are plan and cross-sectional views of the device at a stage of forming the lower film of the top electrode busline in FIG. 20 respectively.
Figure 25B:
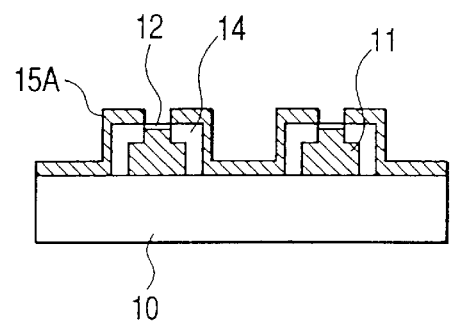

At a next step P26, as shown in FIGS. 24a and 24b, a metallic film to be formed as a top electrode busline lower film 15A is deposited. The metallic film for the top electrode busline lower film 15A is made by forming a first metallic film of a metal such as Mo excellent in adhesive property to the substrate 10 and insulator 12, and then a second metallic film of a metal such as Pt whose surface is less oxidized. Cr, Ta, W or Nb can be used as the material of the metallic film having the strong adhesive property, whereas Au, Ir, Rh or Ru, in addition to Pt, can be used as the material of the metallic film whose surface is less oxidized. When these metals are employed, electric contact of the top electrode busline lower film with a top electrode busline upper film 15B and a top electrode 12 to be formed later can be secured. It is desirable that the metallic film to be formed as the top electrode busline lower film 15A is previously made as thin as possible. In the present embodiment, the Mo film was formed to have a thickness of 20 nm and the Pt film was formed to have a thickness of 10 nm. For this reason, disconnection of the top electrode 13 to be formed later can be prevented. Thereafter, as shown in FIGS. 25a and 25b, at a step 27, the resultant substrate is dipped into an acetone solution to lift off the resist pattern R12 and to remove parts corresponding to the emission areas of the metallic film to be formed as the top electrode busline lower film 15A to form openings therein. At this time, the resist pattern R11 remains without being peeled off.

Figure 26A:
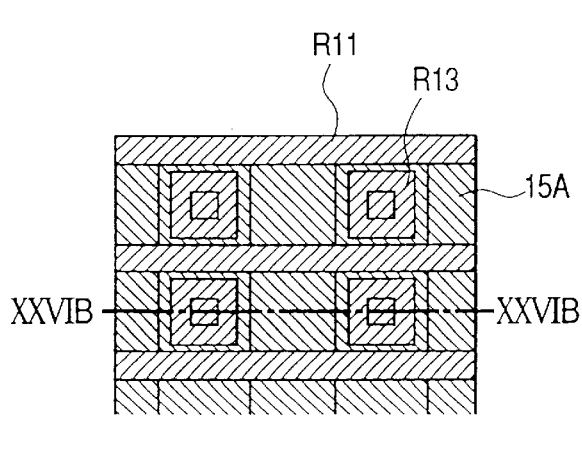
FIGS. 26a and 26b are plan and cross-sectional views of the device at a stage of forming a resist pattern R13 in FIG. 20 respectively.
Figure 26B:
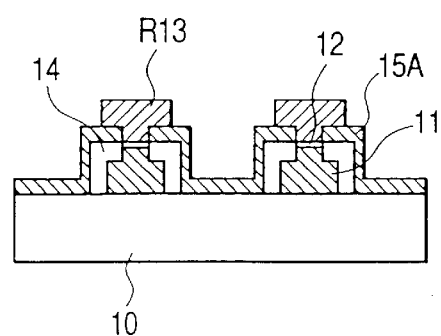

At a next step P28, as shown in FIGS. 26a and 26b, the openings of the metallic film to be formed as the top electrode busline lower film 15A and surrounding areas thereof are covered with a resist pattern R13.

Figure 27A:
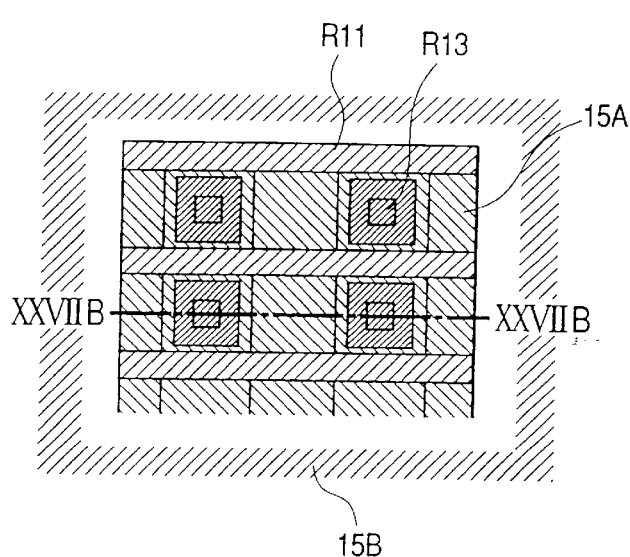
FIGS. 27a and 27b are plan and cross-sectional views of the device at a stage of depositing a metallic film as a top electrode busline upper film in FIG. 20 respectively.
Figure 27B:
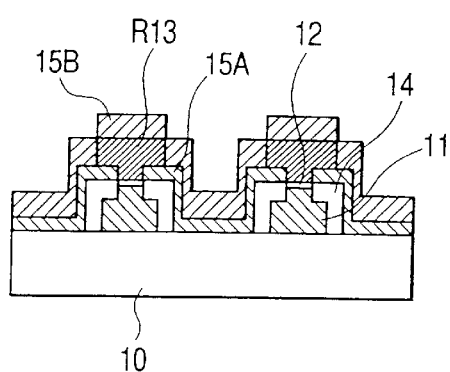
Figure 28A:
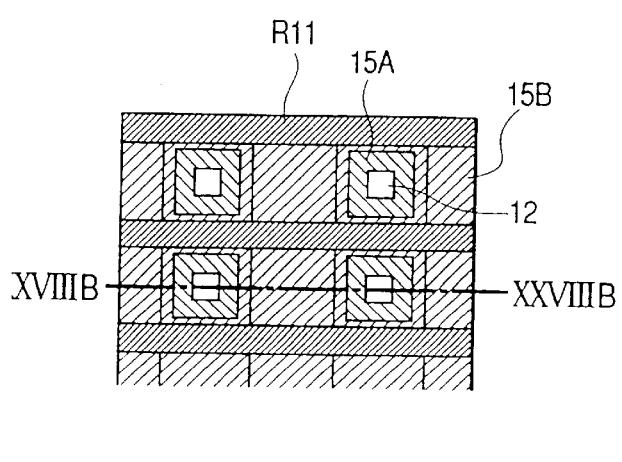
FIGS. 28a and 28b are plan and cross-sectional views of the device at a stage of forming the upper film of the top electrode busline in FIG. 20 respectively.
Figure 28B:
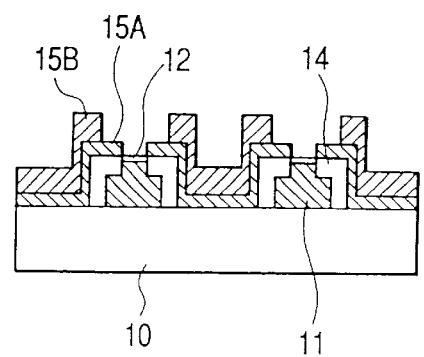

Thereafter, at a step P29, as shown in FIGS. 27a and 27b, a metallic film to be formed as a top electrode busline upper film 15B is formed. In the present embodiment, the metallic film made of Al material having a low resistance was formed by a deposition method. Usable as the material of the metallic film is Au, in addition to Al. The metallic film to be formed as the top electrode busline upper film 15B is previously formed to have a thickness of about 1 μm. This enables reduction of a wiring resistance of the top electrode busline 15 as its initial purpose. After the film formation or deposition, at a step P30, as shown in FIGS. 28a and 28b, the resist pattern R13 is lifted off with acetone to remove parts corresponding to the emission areas of the metallic film to be formed as the top electrode busline upper film 15B and also to remove surrounding areas thereof to form openings therein.

Although the processing of the top electrode busline upper film has been explained in connection with the use of only the lift-off method in the present embodiment, the etching process mentioned in embodiment 1 can be similarly employed.

Figure 29A:
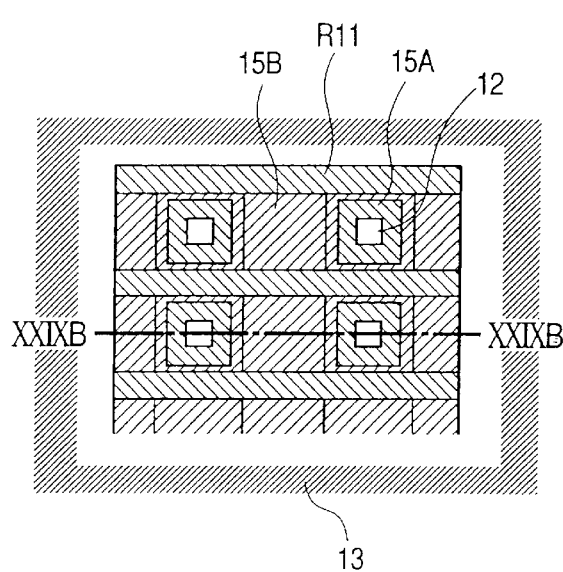
FIGS. 29a and 29b are plan and cross-sectional views of the device at a stage of depositing a top electrode film in FIG. 20 respectively.
Figure 29B:
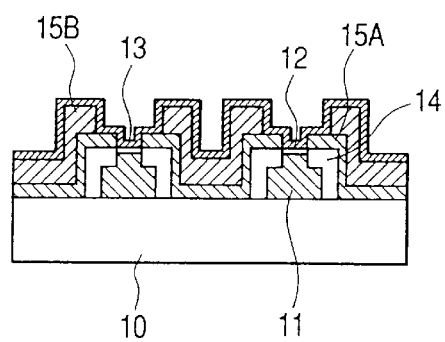

At a next step P31, as shown in FIGS. 29a and 29b, a metallic film to be formed as a top electrode 13 is deposited. The metallic film to be formed as the top electrode 13 is of a three-layer structure, that is, a lower film made of Ir having a good heat resistance, an intermediate layer made of Pt and an upper film made of Au having a good electron emission efficiency. In the present embodiment, these layers were formed to have thicknesses of 1 nm, 2 nm and 3 nm respectively, that is, a total thickness of 6 nm.

Figure 30A:
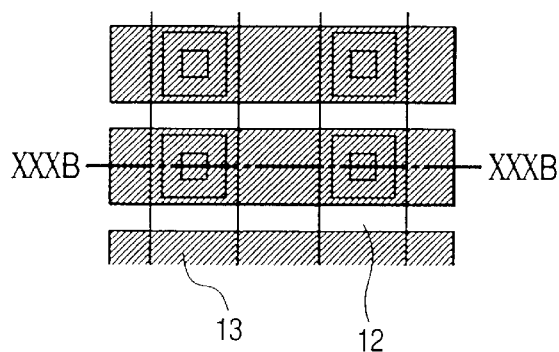
FIGS. 30a and 30b are plan and cross-sectional views of the device at a stage of forming a top electrode in FIG. 20 respectively.
Figure 30B:
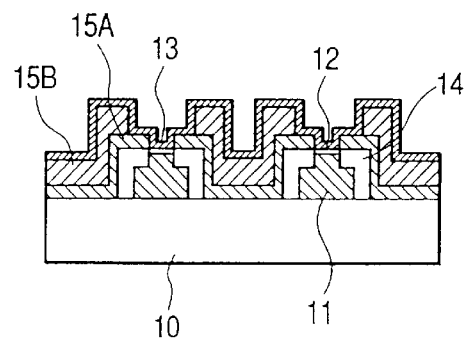
Figure 31:
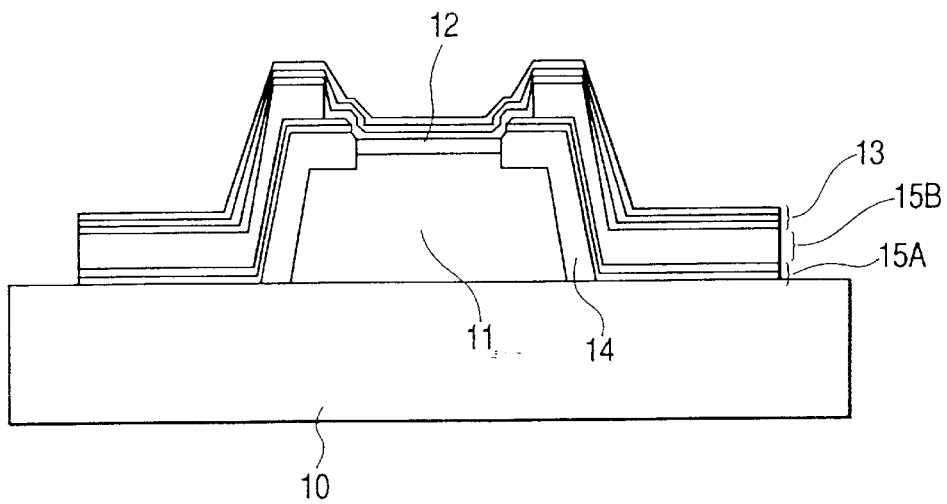
FIG. 31 is a cross-sectional view of the thin-film electron emitter device in accordance with embodiment 2 of the present invention corresponding to one electron emitter.

At a final step P32, as shown in FIGS. 30a and 30b, the stripe-shaped resist pattern R11 is lifted off to process the top electrode busline lower film 15A, top electrode busline upper film 15B and top electrode 13 into stripe shapes at the same time.

In the present embodiment, in this connection, the top electrode has been formed to cover not only the emission areas but also the top electrode busline lower film 15A and top electrode busline upper film 15B. However, it is also possible for the top electrode to cover only the emission areas and top electrode busline lower film 15A, because its electric connection can be obtained.

Through the aforementioned process, a thin-film electron emitter matrix having a structure based on the present invention has been completed. FIG. 31 is an enlarged cross-sectional view of the thin-film electron emitter device manufactured in such a manner as mentioned above, corresponding to one electron emitter. The electron emitter has a featured structure that an opening of a thin top electrode busline lower film 15A is self-aligned on a field insulator 14 to be contacted with emission areas, an opening of a thick top electrode busline upper film 15B is provided away from the emission areas, and a top electrode is formed on the top electrode busline upper film 15B, top electrode busline lower film 15A and an insulator 12 of the emission areas. Since the top electrode busline lower film 15A is made thin, the top electrode 13 can be less disconnected at its step and, even when the step of the top electrode busline upper film 15B is highly sharp, electric contact with the top electrode busline 15 can be secured. Accordingly the top electrode busline upper film 15B can be formed to have any large thickness and thus the top electrode busline 15 having a low resistance can be realized.

Embodiment 3

The processing of the top electrode busline lower film 15A has been carried out by the lift-off method in any of embodiment 1 and embodiment 2. The lift-off method is advantageous in that it can process any material and that an electrode made of a noble metal such as Pt, Au, Ir, Rh or Ru can be used as a top face part of the top electrode bus line lower film, but is disadvantageous in that, in a resist lift-off process, parts of the top electrode bus line lower film having covered its resist side faces remain at processed sections and flashes tend to be generated. Residual flashes may cause, in some cases, disconnection of the top electrode. In order to solve this problem, it is desirable to process a top electrode busline lower film by a wet etching method.

Figure 32:
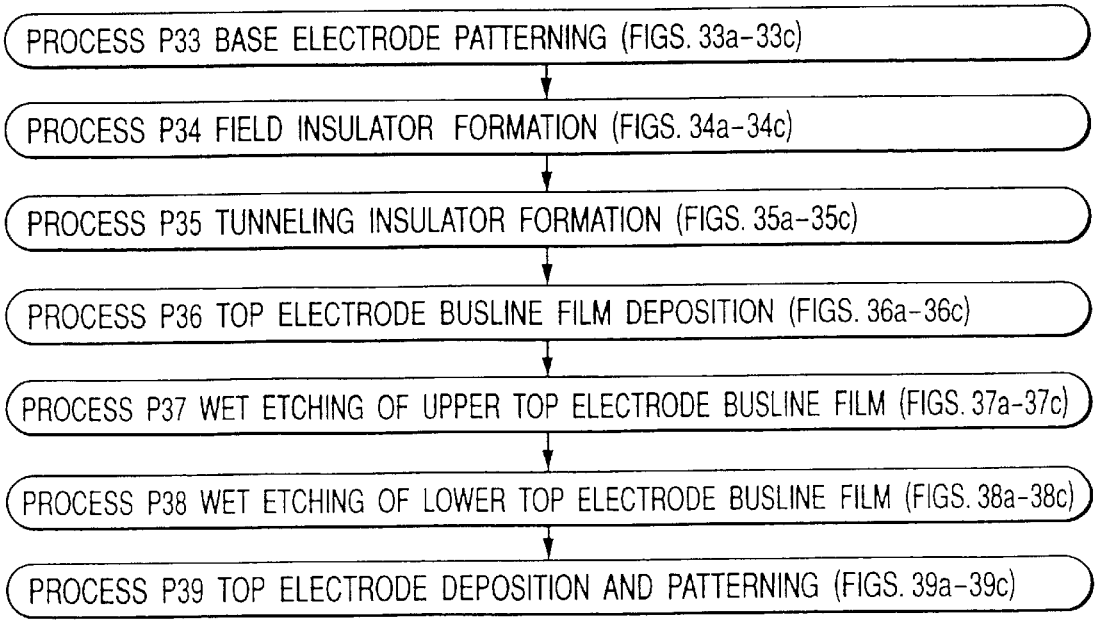
FIG. 32 is a process flowchart for explaining a method for manufacturing a thin-film electron emitter device in accordance with embodiment 3 of the present invention.

A thin-film electron emitter device in accordance with embodiment 3 will be explained with reference to FIGS. 32, 33a to 33c, 34a to 34c, 35a to 35c, 36a to 36c, 37a to 37c, 38a to 38c, 39a to 39c, and 40. FIG. 32 is a flowchart for explaining steps in a method for manufacturing a thin-film electron emitter device, FIGS. 33a to 33c, 34a to 34c, 35a to 35c, 36a to 36c, 37a to 37c, 38a to 38c, and 39a to 39c are plan and cross-sectional views in the respective steps respectively, and FIG. 40 is a cross-sectional view of the thin-film electron emitter device corresponding to one electron emitter.

Figure 33A:
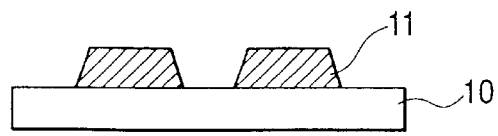
FIGS. 33a to 33c are plan and two cross-sectional views of the device at a stage of forming a base electrode in FIG. 32 respectively.
Figure 33B:
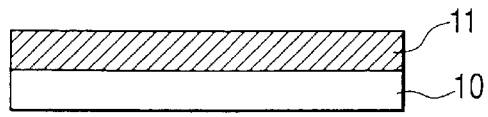
Figure 33C:
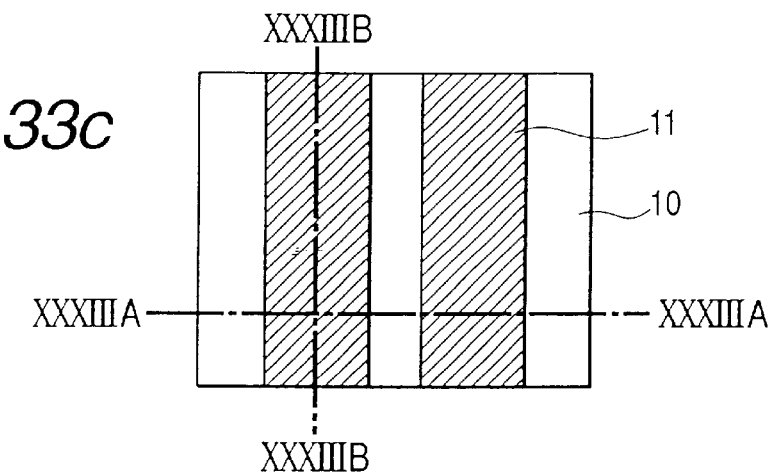
Figure 34A:
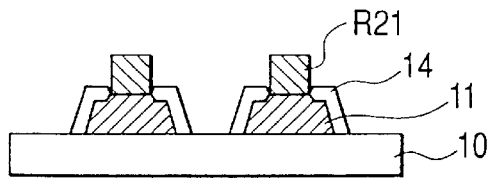
FIGS. 34a to 34c are plan and two cross-sectional views of the device at a stage of forming a field insulator in FIG. 32 respectively.
Figure 34B:
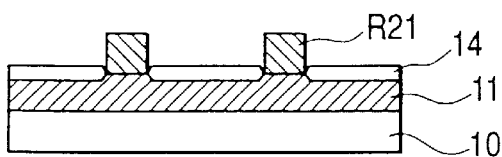
Figure 34C:
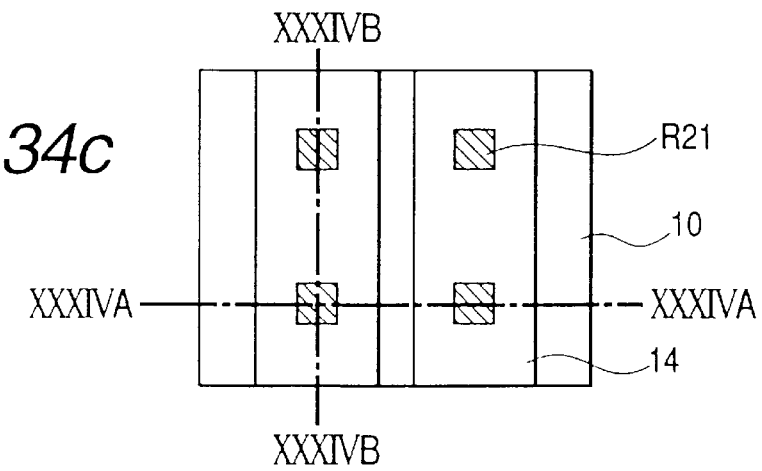
Figure 35A:
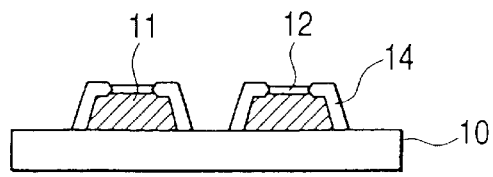
FIGS. 35a to 35c are plan and two cross-sectional views of the device at a stage of forming an insulator in FIG. 32 respectively.
Figure 35B:
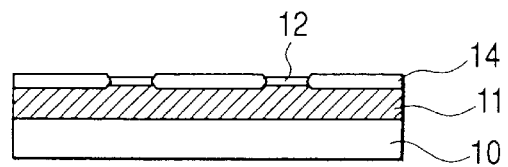
Figure 35C:
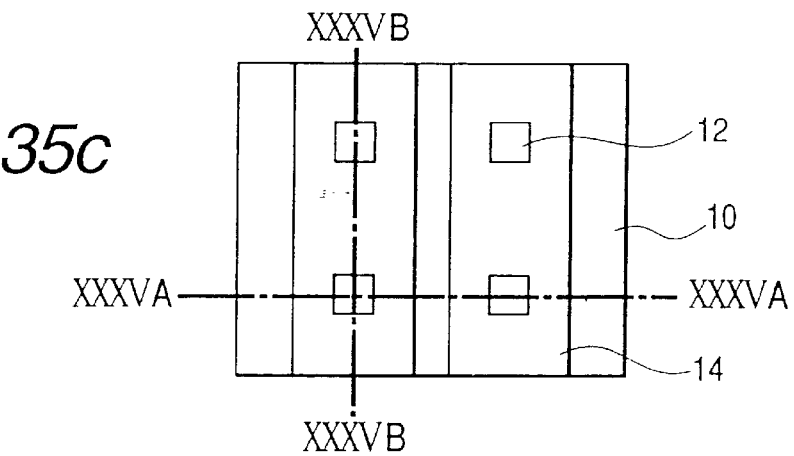

At a step P33, first of all, a metallic film for a base electrode is deposited on an insulating substrate 10. The base electrode is made of Al or Al alloy material. In the present embodiment, the base electrode was made of Al—Nd alloy. The film deposition was carried out, for example, by sputtering. The base electrode was formed to have a thickness of 300 nm. After the film deposition, a base electrode 11 having such a stripe shape as shown in FIGS. 33a to 33c is formed.

Explanation will next be made as to how to form a field insulator 14 at a step P34 and a insulator 12 at a step P35 by referring to FIGS. 34a to 34c and 35a to 35c. Parts on the base electrode 11 to be formed as emission areas are first masked with a resist film R21, and the other parts thereof are anodized selectively thick to form a field insulator 14. With a anodic oxidation voltage of 100V, the field insulator 14 having a thickness of about 136 nm is formed. Next, the resist film R21 is removed and the remaining surface of the base electrode 11 is anodized. With the anodic oxidation voltage of, e.g., 6V, the insulator 12 having a thickness of about 10 nm is formed b on the base electrode.

Figure 36A:
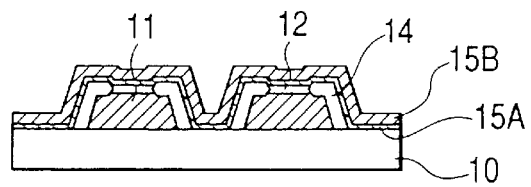
FIGS. 36a to 36c are plan and two cross-sectional views of the device at a stage of forming a top electrode busline film in FIG. 32 respectively.
Figure 36B:
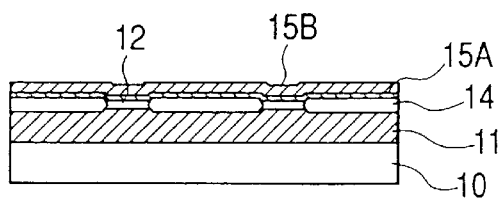
Figure 36C:
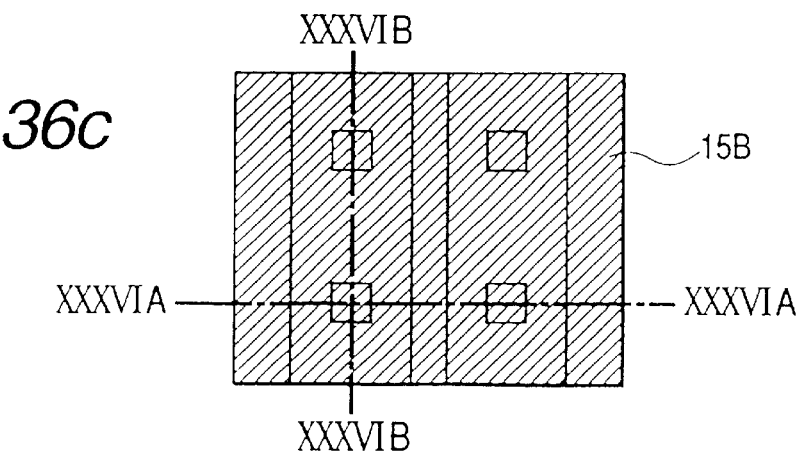

At a next step P36, as shown in FIGS. 36a to 36c, a stacked film for a top electrode busline 15 to be formed as a power supply or service wire to the top electrode 13 is formed by sputtering. In this case, a top electrode busline lower film 15A was made of, for example, W, and a top electrode busline upper film 15B was made of, for example, Al—Nd alloy. Further, the top electrode busline lower film 15A is formed to have a thickness of about several nm to about several tens of nm to prevent the top electrode 13 from being disconnected at a step of the top electrode busline lower film 15A; whereas, the top electrode busline upper film 15B is formed to have a thickness of about several tens of nm to about several hundreds of nm to provide sufficient power supply.

Figure 37A:
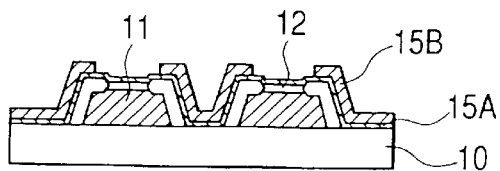
FIGS. 37a to 37c are plan and two cross-sectional views of the device at a stage of forming an upper film of a top electrode busline in FIG. 32 respectively.
Figure 37B:
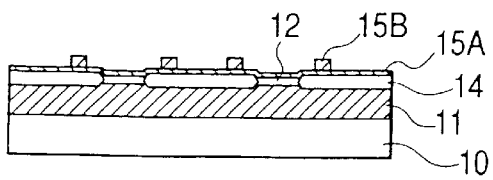
Figure 37C:
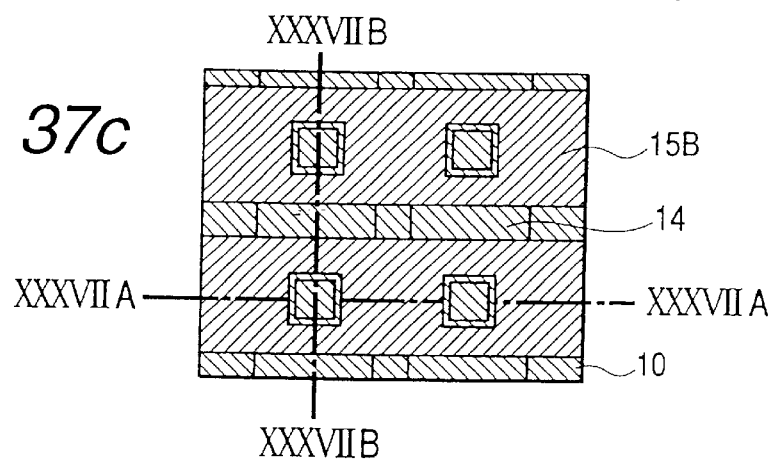

At a next step P37, the top electrode busline upper film 15B is etched, as shown in FIGS. 37a to 37c. This etching is selectively carried out so that the top electrode busline upper film 15B is etched, while the top electrode busline lower film 15A is substantially not etched. Usable as the selective etching is wet etching, for example, with use of a mixture solution of phosphoric acid, nitric acid, acetic acid and water.

Figure 38A:
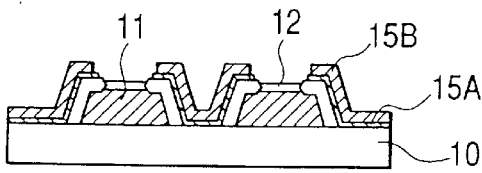
FIGS. 38a to 38c are plan and two cross-sectional views of the device at a stage of forming a lower film of the top electrode busline in FIG. 32 respectively.
Figure 38B:
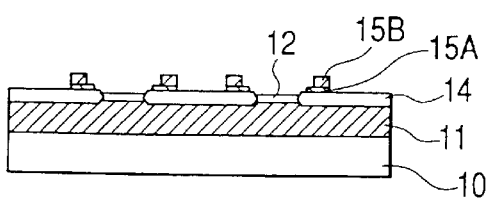
Figure 38C:
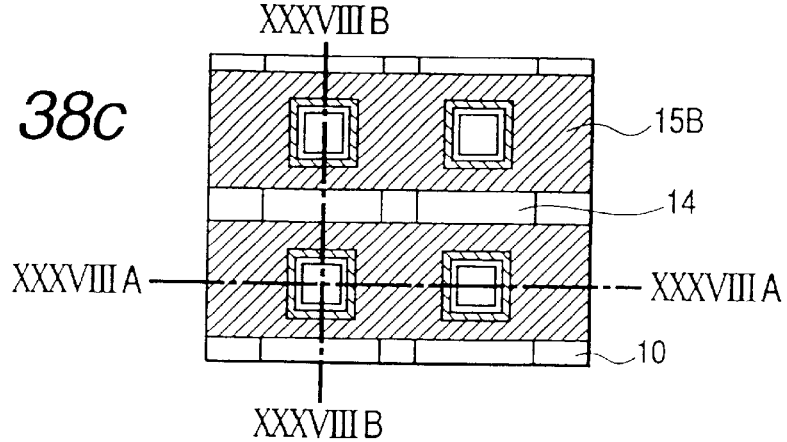

At a next step P38, the top electrode busline lower film 15A is processed by etching. The top electrode busline lower film 15A is processed into such a shape that, to achieve electric contact with the top electrode 13 to be later formed on a side of the insulator 12 to be formed as the emission areas, the top electrode busline lower film remains as extending from the opening of the top electrode busline upper film 15B toward the emission area side, as shown in FIGS. 38a to 38c.

Figure 39A:
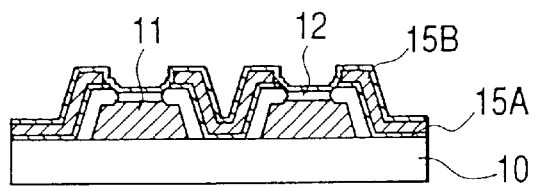
FIGS. 39a to 39c are plan and two cross-sectional views of the device at a stage of forming a top electrode in FIG. 32 respectively.
Figure 39B:
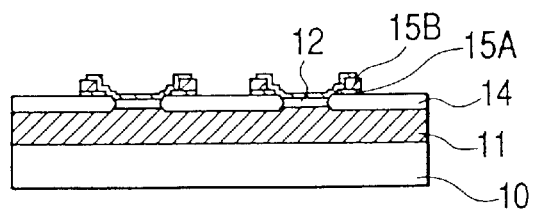
Figure 39C:
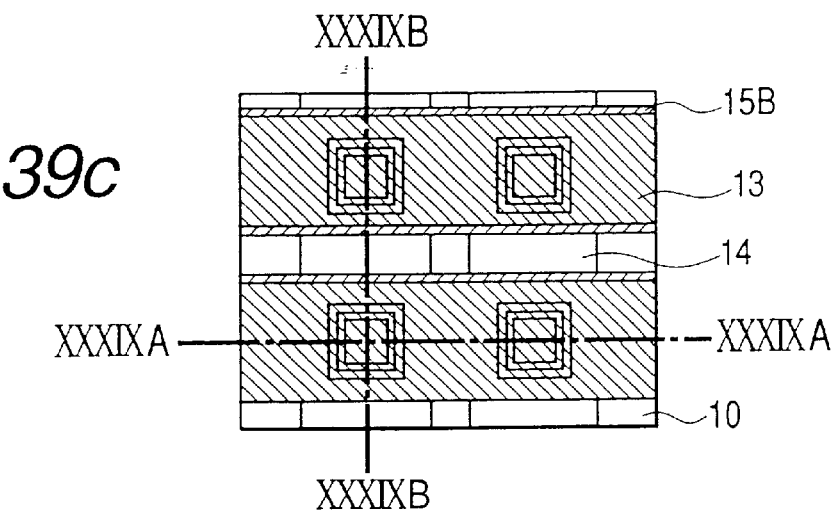
Figure 40:
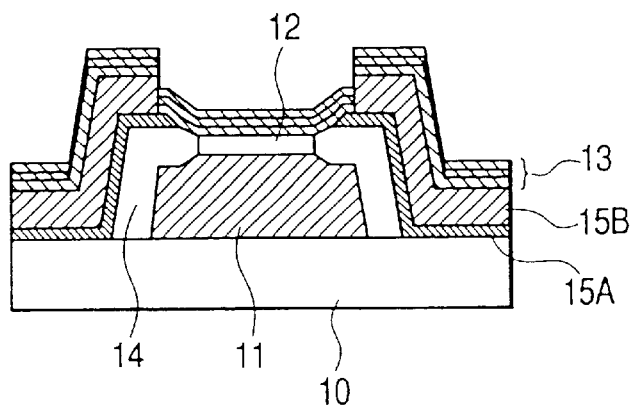
FIG. 40 is a cross-sectional view of a thin-film electron emitter device in accordance with embodiment 3 of the present invention corresponding to one electron emitter.

At a final step P39, a top electrode film is deposited by sputtering and processed, as shown in FIGS. 39a to 39c. For example, the top electrode 13 is of a stacked film structure of Ir, Pt and Au films and has a thickness of several nm. In this case, the Ir film was formed to have a thickness of 1 nm, the Pt film was to have a thickness of 2 nm, and the Au film was to have a thickness of 3 nm, and thus the top electrode was formed to have a total thickness of 6 nm. FIG. 40 shows a cross-sectional view of a thin-film electron emitter after the top electrode film has been formed. The top electrode 13 has an electric contact with the thin top electrode busline lower film 15A on the side of the emission area.

Although the single W film has been used as the top electrode busline lower film 15A and the Al alloy film has been used as the top electrode busline upper film 15B in the present embodiment, any combination between these materials can be selected, so long as, with respect to the selected materials, their standard oxidation-reduction potentials given in Table 1 satisfy a relation that the potential of the lower film of the top electrode busline 15 is equal to or larger than that of the upper film thereof. This is because, when the stacked-film electrode is processed by wet etching, contacts between different types of metal in etchant cause a battery effect. That is, since a material having a low standard oxidation-reduction potential tends to be preferentially dissolved into the etchant, when contacted to a material having a high standard oxidation-reduction potential, use of a material having a low standard oxidation-reduction potential for the lower film causes the lower film to tend to disappear and the top electrode busline 15 to be easily released. For example, as in the structure of the top electrode busline lower film 15A explained in embodiment 1 and embodiment 2, its lower film is made of such a material as W having a low standard oxidation-reduction potential and its top surface is covered with the upper film made of noble metal such as Au having a high standard oxidation-reduction potential; wet etching of the top electrode busline involves the aforementioned problem. Actually, when the Au layer is etched to open the emission area and then the W layer is wet etched with use of, e.g., ammonia and hydrogen peroxide, the W layer is largely side-etched to cause the Au layer to be peeled off.

TABLE 1

| MATERIAL | Standard oxidation-reduction potential |
|---|---|
| Al | −1.66 |
| Ti | −1.63 |
| Zr | −1.53 |
| Cr | −0.74 |
| Ni | −0.25 |
| Mo | −0.2 |
| W | −0.12 |
| Pt | 1.2 |
| Au | 1.5 |

When the top electrode busline lower film 15A is made of W and the top electrode busline upper film 15B is made of Al or Al alloy as in the present embodiment, on the other hand, the W layer has a standard oxidation-reduction potential of −0.12V, whereas the Al layer has a standard oxidation-reduction potential as low as −1.66V, resulting in no peeling off of the top electrode busline.

Among combinations between materials shown in Table 1, especially desirable material combinations are that the top electrode busline upper film 15B is made of Al or Al alloy and the top electrode busline lower film 15A is made of W, Ti, Cr, Mo, Zr or Ni. This is because, since Al material has a low resistance, Al is suitable for the top electrode busline upper film 15B having a main purpose of power supply, and because, since Al material has a low standard oxidation-reduction potential, selection of the material of the top electrode busline lower film 15A can be facilitated. Further, the top electrode busline lower film 15A is made of W, Ti, Cr, Mo, Zr or Ni. This is because the top electrode busline lower film can provide a good adhesive property to the substrate and that, because its surface oxidation film has a low insulating property, the lower film can easily secure electric contact to the top electrode. Particularly, use of W or Ti for the top electrode busline lower film is preferable from the viewpoint of processability because W or Ti is not etched with a mixture solution of phosphoric acid, nitric acid and acetic acid used for etching of the Al material of the top electrode busline upper film 15B so that the top electrode busline upper film 15B can be selectively etched and further because W or Ti can be etched with a mixture solution of ammonia and hydrogen peroxide which only causes slight damage to the insulating layer 12.

Embodiment 4

Figure 41A:
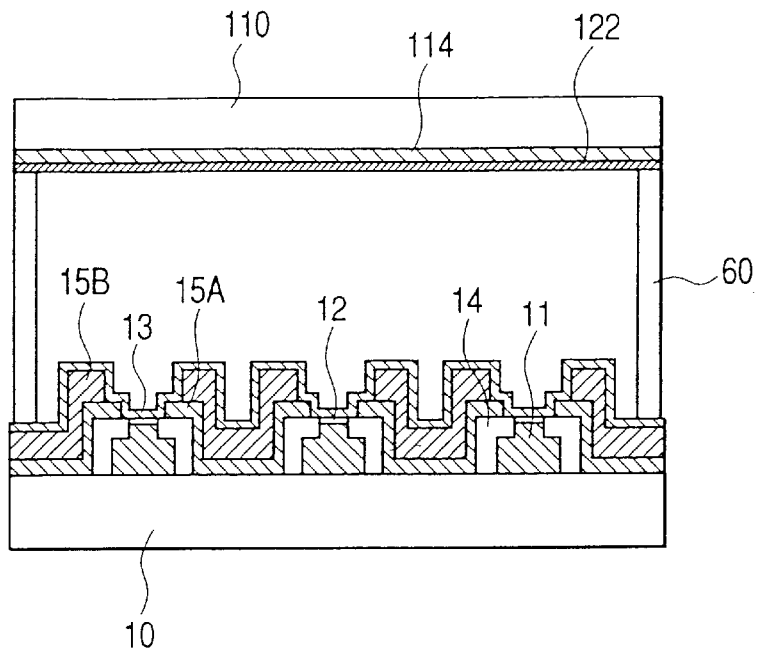
FIGS. 41a to 41b are partially cross-sectional views of a display panel of a display apparatus in accordance with embodiment 4 of the present invention in a length direction of the base electrode.
Figure 41B:
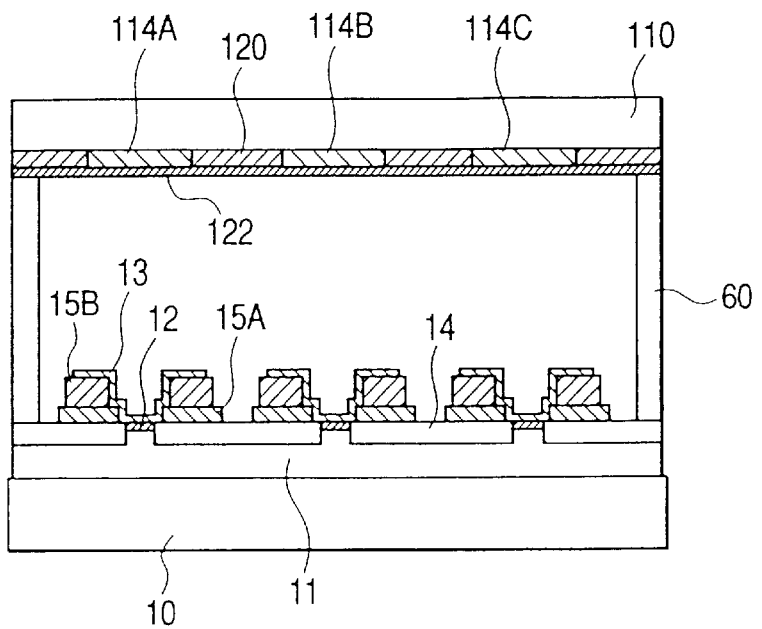

A display apparatus in accordance with embodiment 4 will be explained with reference to FIGS. 41*a* and 41*b*, and FIGS. 42 to 45. FIGS. 41*a* and 41*b* are cross-sectional views of a display apparatus panel in a length direction of the base electrode, wherein the substrate 10 having the thin-film electron emitter device formed in the embodiment 1 to embodiment 3 is arranged as opposed to a face plate 110 on a display side with a spacers 60 disposed therebetween. The face plate 110 on the display side is made of light-permeable glass or the like.

For the purpose of increasing a contrast of the display apparatus, first of all, a black matrix 120 is formed. The black matrix 120 is disposed between phosphors 114 in FIGS. 41*a* and 41*b*.

The black matrix 120 is formed by coating on the face plate 110 a mixture solution of graphite powder, PVA (polyvinyl alcohol) and ammonia-bichromate, irradiating ultraviolet rays on desired parts of the coated surface for light exposure and then removing unexposed parts thereof.

Figure 42:
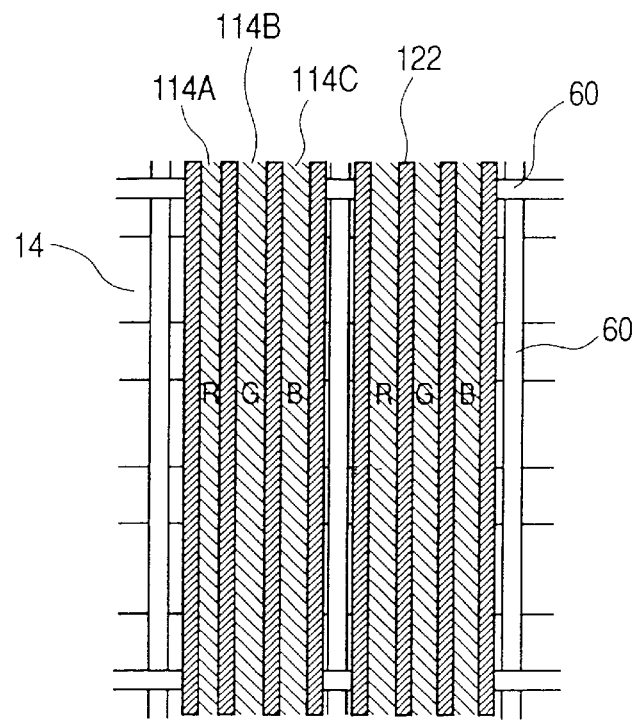
FIG. 42 is a plan view of FIGS. 41a and 41b in a fluorescent screen location.

Next red phosphor strips 114A is formed. The red phosphor strips 114A are made by coating on the face plate 110 an aqueous mixture solution of phosphor particles, PVA (polyvinyl alcohol) and ammonia-bichromate, irradiating ultraviolet rays on parts to be formed as the red phosphor strips 114 for their light exposure and then removing unexposed parts with running water. In this way, the red phosphor strips 114A are made into a pattern. That is, the red phosphor strips 114A are made in the form of such a stripe-shaped pattern as shown in FIG. 42. The illustrated stripe pattern is given as an example and thus it goes without saying that its pattern may be modified according to the display design to form one pixel of 4 adjacent dots as another example (RGBG pattern). The phosphor stripes are formed to have a thickness of about 1.4–2 layers. Similarly green phoshor stripes 114B and blue phosphor stripes 114C are formed. Usable as the phosphors are, for example, $Y_2O_2S$:Eu(P22-R) for red color, ZnS:Cu,Al(P22-G) for green color, and ZnS:Ag(P22-B) for blue color.

Next, a metal back 122 is made by filming with a film of nitrocellulose or the like and by evaporating Al on the entire surface of the face plate 110 to a thickness of about 50–300 nm. The metal back 122 acts as an accelerating electrode. Thereafter, the face plate 110 is heated to a temperature of about 400° C. for thermal decomposition of organic substance such as the filming material and PVA. In this way, the formation of the face plate 110 is completed.

Figure 43:
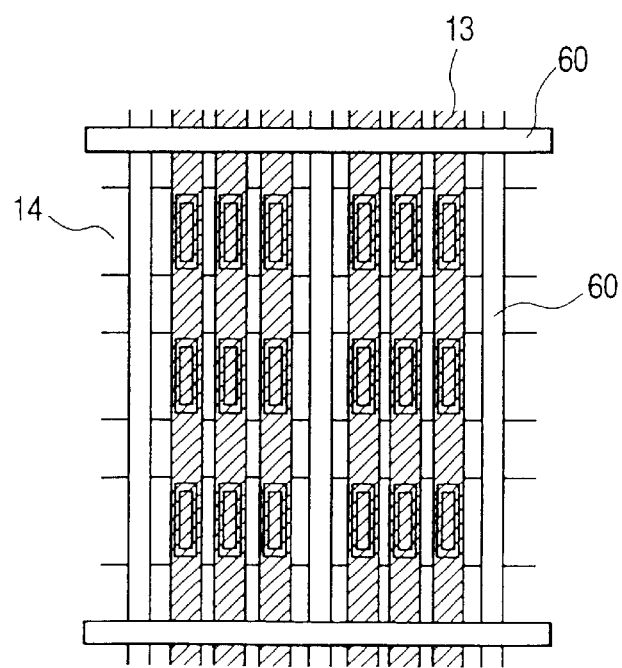
FIG. 43 is a plan view of a substrate in FIGS. 41a and 41b.

The face plate 110, substrate 10 and spacers 60 thus fabricated are hermetically sealed. The thickness of the spacers 60 is set so that a distance between the face plate 110 and substrate 10 becomes about 1–3 mm. A positional relation between the face plate 110 and substrate 10 is as shown in FIG. 41. FIG. 43 shows a pattern of the thin-film electron emitter device formed on the substrate 10 as associated with FIG. 41.

The spacers 60 are made into such a shape as shown, e.g., in FIGS. 41a, 41b, 42 and 43. In the illustrated example, one spacer 60 as a supporting pole is provided for dots for emission of red (R), green (G) and blue (B) color light, i.e., for every three rows of the emission areas, but the number (density) of the supporting poles may be reduced so long as it can provide a mechanical strength sufficient to support the emission areas. The spacers 60 are manufactured by making a desired shape of holes, e.g., by sand blasting in such an insulating plate as glass or ceramics having a thickness of about 1–3 mm.

The seal panel is evacuated into a vacuum level of about $1 \times 10^{-5}$ Pa and then sealed off. In this manner, a display panel using the thin-film electron emitter device is completed.

Since the distance between the face plate 110 and substrate 10 is as long as 1–3 mm in the present embodiment in this way, an accelerating voltage to be applied to the metal back 122 can be made as high as 3–6 KV. Accordingly, as mentioned above, phosphors for a cathode-ray tube (CRT) can be used as the phosphor strips 114.

Figure 44:
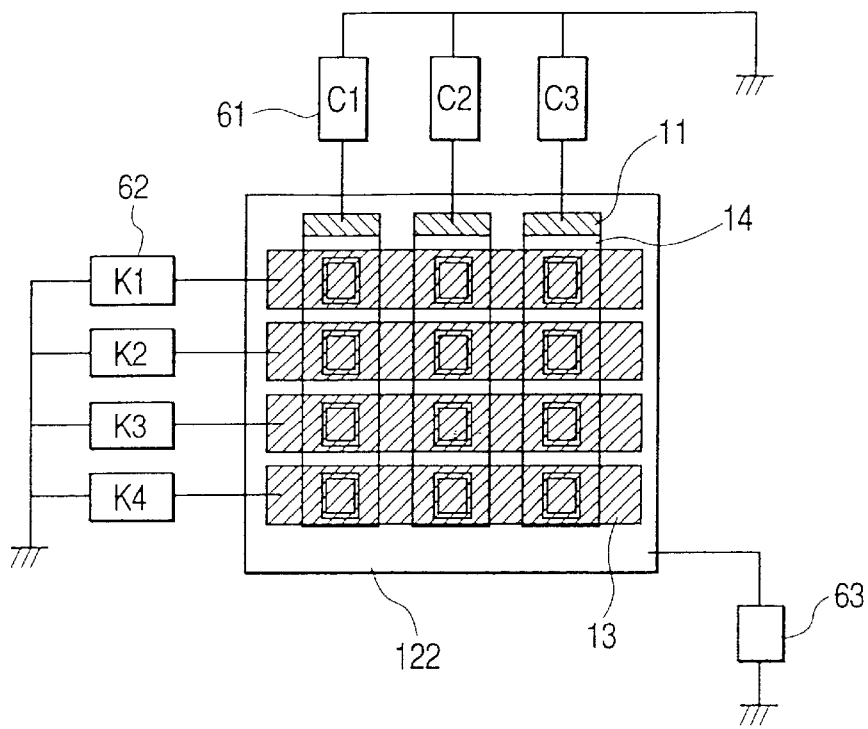
FIG. 44 is a connection diagram for wiring between the display panel of the display apparatus of embodiment 4 of the present invention and a drive circuit.

FIG. 44 is a connection diagram of the display apparatus panel manufactured in this way connected to a driving circuit. The base electrodes 11 are connected to base electrode driving circuits 61, while the top electrodes 13 are connected to top electrode driving circuits 62. It is now assumed that an intersection between the n-th base electrode 11 Kn and the m-th top electrode busline 15 Cm is expressed by (n,m). An accelerating voltage 63 of about 3–6 KV is always applied to the metal back 122.

Figure 45:
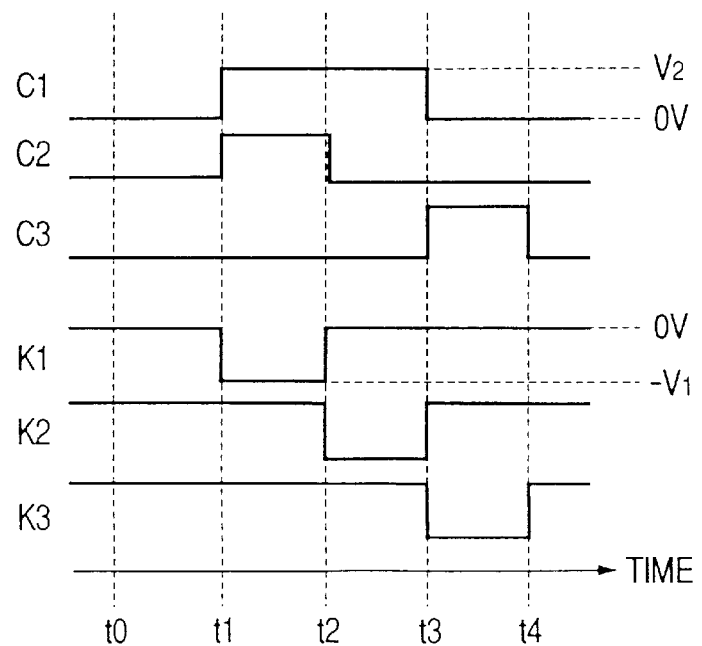
FIG. 45 is a chart showing waveforms of drive voltages in the display apparatus of embodiment 4 of the present invention.

FIG. 45 shows waveforms of voltages generated in the respective driving circuits. At a time t0, since all of the electrodes have zero voltage, no electron is emitted and thus the phosphor strips 114 will not emit light. At a time t1, a voltage of −V1 is applied to the base electrode 11 K1, while a voltage of +V2 is applied to the top electrode 13 C1 and 13 C2. A voltage of (V1+V2) is applied between the top and base electrodes 11 and 13 at intersections (1,1) and (1,2), so that, when the voltage (V1+V2) is set to be not smaller than an electron emission threshold voltage, electrons are emitted into a vacuum from the thin-film electron emitters at the two intersections. The emitted electrons are accelerated by the accelerating voltage 63 applied to the metal back 122 and then collides with the associated phosphor strips 114 to illuminate the phosphor strips 114. At a time t2, a voltage of −V1 is applied to the base electrode 11 K2, a voltage of V2 is applied to the top electrode 13 C1, and an intersection (2,1) is similarly illuminated. In this way, a desired image or information can be displayed by changing signals to be applied to the top electrodes 13.

Further, an image with gradation can be displayed by suitably changing the amplitude of a voltage V1 to be applied to the top electrodes 13.

In the display apparatus of the present invention, the top electrode busline upper film 15B of the top electrode busline 15 in the display panel can be made thick and the top electrode busline 15 has a low resistance throughout the full length of the panel. Therefore even when the display apparatus of the present invention is used as a large-scale display apparatus, an image having a uniform brightness can be displayed. Furthermore, the disconnection of the top electrodes 13 can be prevented, a possibility of generation of a defect such as lack of dots can be eliminated, and thus a panel production yield can be improved.

In accordance with the aforementioned embodiments, since the thicker part of the top electrode busline can be made thick, image display having a uniform brightness can be realized even when the present invention is applied to a large-size display panel. In addition, generation of a defect such as lacked dot caused by the disconnected top electrode can be minimized and thus a yield can be improved.

What is claimed is:

1. A thin-film electron emitter device comprising:

an insulating substrate;

electron emission areas each in a multi-layer structure having a base electrode, an electron emissive insulator and a top electrode formed on said insulating substrate in this order, said electron emission areas being arranged in a matrix;

a field insulator formed around the electron emissive insulator in each of said electron emission areas, said field insulator being thicker than said electron emissive insulator; and top electrode buslines each formed on the field insulators in respective ones of the electron emission areas and having a connection portion for connection with the top electrodes in said respective electron emission areas, said connection portion of each top electrode busline having a thickness smaller than that of another portion of the busline, wherein each of said top electrodes covers its respective top electrode buslines and is connected with said connection portion of its respective top electrode buslines.

2. A thin-film electron emitter device as set forth in claim 1, wherein each of said top electrode buslines is a stacked film which includes a lower film and an upper film formed on said lower film, said lower film forming said connection portion of the top electrode buslines.

3. A thin-film electron emitter device as set forth in claim 2, wherein an upper surface part of said lower film is formed as a film made of one selected from the group consisting of Pt, Au, Ir, Rh and Ru.

4. A thin-film electron emitter device as set forth in claim 2, wherein said upper and lower films of said top electrode busline are made of materials such that a standard oxidation-reduction potential is constant or increases as viewed in a direction from said upper film to said lower film.

5. A thin-film electron emitter device as set forth in claim 4, wherein said lower film is a single film made of one element selected from the group consisting of W, Ti, Cr, Mo, Zr and Ni or is a stacked film of layers made of elements selected from said group, the standard oxidation-reduction potential of said stacked film as viewed in a direction toward said upper film decreases, and said upper film is made of Al or Al alloy.

6. A thin-film electron emitter device as set forth in claim 5, wherein said lower film has a single layer structure made of W or Ti.

7. A thin-film electron emitter device as set forth in claim 1, wherein said electron emissive insulator includes an insulator film and a semiconductor film stacked on said insulator film.

8. A thin-film electron emitter device as set forth in claim 1, wherein said insulator has porous semiconductor.

9. A display apparatus comprising:

a display panel wherein a substrate having said thin-film electron emitter device set forth in claim 1 formed thereon and a face plate having phosphors coated thereon are vacuum-sealed so that electrons emitted from said thin-film electron emitter device collide with said phosphor;

a base electrode driving circuit connected to said base electrodes; and a top electrode driving circuit connected to said top electrode buslines.

10. A display apparatus as set forth in claim 9, wherein each of said top electrode buslines is a stacked film which includes a lower film and an upper film formed on said lower film, said lower film forming said connection portion of the top electrode buslines.

11. A display apparatus as set forth in claim 10, wherein an upper surface part of said lower film is formed as a film made of one selected from the group consisting of Pt, Au, Ir, Rh and Ru.

12. A display apparatus as set forth in claim 10, wherein said top electrode busline are made of materials such that a standard oxidation-reduction potential is constant or increases as viewed in a direction from said upper film to said lower film.

13. A display apparatus as set forth in claim 12, wherein said lower film is a single film made of one element selected from the group consisting of W, Ti, Cr, Mo, Zr and Ni or is a stacked film of layers made of elements selected from said group, the standard oxidation-reduction potential of said stacked film as viewed in a direction towards said upper film decreases, and said upper film is made of Al or Al alloy.

14. A display apparatus as set forth in claim 13, wherein said lower film is in a single layer structure made of W or Ti.

15. A display apparatus comprising:

a display panel wherein a substrate having a thin-film electron emitter device formed thereon and a face plate having phosphors coated thereon are vacuum-sealed so that electrons emitted from said thin-film electron emitter device collide with said phosphor;

said thin-film electron emitter device including:
an insulating substrate;
electron emission areas each in a multi-layer structure having a base electrode, an electron emissive insulator and a top electrode formed on said insulating substrate in this order and arranged in a matrix;
a field insulator formed around the electron emissive insulator in each of said electron emission areas, said field insulator being thicker than said electron emissive insulator; and
top electrode buslines each formed on the field insulators in respective ones of said electron emission areas and having a connection portion for connection with the top electrodes in said electron emission areas, said connection portion of each top electrode busline having a thickness smaller than that of another portion of the busline,
wherein each of said top electrodes covers its respective top electrode buslines and is connected with said connection portion of its respective top electrode buslines;

a base electrode driving circuit connected to said base electrodes; and a top electrode driving circuit connected to said top electrode buslines.

16. A thin-film electron emitter device as set forth in claim 1, wherein each of said top electrode buslines is a stacked film including a lower film and an upper film formed thereon, said lower film extending to surround the electron emissive insulator more closely than the upper film above the base electrode so that a portion of the lower film which the upper film does not overly forms said connection portion.

* * * * *